United States Patent
Inokuchi et al.

(10) Patent No.: US 10,325,082 B2
(45) Date of Patent: Jun. 18, 2019

(54) INFORMATION PROCESSING APPARATUS, INFORMATION PROCESSING SYSTEM, AUTHENTICATION METHOD, AND RECORDING MEDIUM

(71) Applicants: Satoru Inokuchi, Aichi (JP); Taku Ikawa, Kanagawa (JP)

(72) Inventors: Satoru Inokuchi, Aichi (JP); Taku Ikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 187 days.

(21) Appl. No.: 15/420,318

(22) Filed: Jan. 31, 2017

(65) Prior Publication Data

US 2017/0220787 A1    Aug. 3, 2017

(30) Foreign Application Priority Data

Feb. 3, 2016 (JP) .................. 2016-018992
Oct. 13, 2016 (JP) .................. 2016-201500

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/35* (2013.01); *G06Q 10/10* (2013.01); *G06Q 2220/00* (2013.01)

(58) Field of Classification Search
None
See application file for complete search history.

(56) References Cited

U.S. PATENT DOCUMENTS 9,819,403 B2 * 11/2017 Forenza ................ H04B 7/01
2004/0174434 A1 * 9/2004 Walker ............... H04N 1/32128
348/211.3
(Continued)

FOREIGN PATENT DOCUMENTS

| JP | 2005-258793 | 9/2005 |
| JP | 2009-193199 | 8/2009 |
| JP | 2014-045271 | 3/2014 |

OTHER PUBLICATIONS

Lehtonen, Mikko O., et al. Trust and Security in RFID-Based Product Authentication Systems. IEEE Systems Journal, vol. 1, Issue: 2. https://ieeexplore.ieee.org/stamp/stamp.jsp?tp=&arnumber=4383013 (Year: 2007).*

(Continued)

*Primary Examiner* — Jeremiah L Avery
(74) *Attorney, Agent, or Firm* — Harness, Dickey & Pierce, P.L.C.

(57) ABSTRACT

An information processing apparatus includes: a radio communication unit configured to start emission of radio waves for performing radio communication with a radio tag, and obtain specific information from the radio tag, at least after a time point at which a user in a predetermined range is detected by a detecting unit; a first authentication unit configured to execute first authentication for the radio tag, based on the specific information obtained by the radio communication unit; a second authentication unit configured to execute second authentication for a user included in an image acquired by an imaging unit, based on feature information of the image; and an apparatus authentication unit configured to authorize the user to use the information processing apparatus, if a user of the radio tag authenticated by the first authentication is the same as the user authenticated by the second authentication.

20 Claims, 17 Drawing Sheets

(51) Int. Cl.
*G06F 21/35* (2013.01)
*G06Q 10/10* (2012.01)

(56) References Cited

U.S. PATENT DOCUMENTS

| | | | |
|---|---|---|---|
| 2006/0201432 A1* | 9/2006 | Pratt | A01K 29/00 119/51.02 |
| 2010/0289627 A1* | 11/2010 | McAllister | G06Q 10/087 340/10.42 |
| 2013/0127980 A1* | 5/2013 | Haddick | G06F 3/013 348/14.08 |
| 2013/0341406 A1* | 12/2013 | Tamburrini | G06K 7/10881 235/470 |
| 2013/0346261 A1* | 12/2013 | Phillips | G06K 9/00771 705/28 |
| 2014/0081874 A1* | 3/2014 | Lewis | G07F 19/205 705/72 |
| 2014/0149894 A1 | 5/2014 | Watanabe et al. | |
| 2014/0162598 A1* | 6/2014 | Villa-Real | H04M 1/66 455/411 |
| 2014/0309864 A1* | 10/2014 | Ricci | H04W 4/21 701/36 |
| 2015/0007307 A1* | 1/2015 | Grimes | G09B 5/08 726/18 |
| 2015/0358491 A1 | 12/2015 | Watanabe et al. | |
| 2016/0087933 A1* | 3/2016 | Johnson | H04W 4/70 709/245 |
| 2017/0108236 A1* | 4/2017 | Guan | G05B 19/04 |

OTHER PUBLICATIONS

Peyravi, Narges; Jafari, Shahram. Optimization and Integration of Electronic Identity Authentication Using a Biometric Indicator and RFID. 2010 IEEE Conference on Cybernetics and Intelligent Systems. https://ieeexplore.ieee.org/stamp/stamp.jsp?tp=&arnumber=5518565 (Year: 2010).*

Min, Dae-Gi, et al. The Entrance Authentication System in Real-Time using Face Extraction and the RFID Tag. 2011 International Conference on Ubiquitous Computing and Multimedia Applications. https://ieeexplore.ieee.org/stamp/stamp.jsp?tp=&arnumber=6172089 (Year: 2011).*

* cited by examiner

FIG.6

| DATA TYPE | DATA 1 | DATA 2 | ... | DATA 300 |
|---|---|---|---|---|
| USER NUMBER | 101001 | 101002 | ... | 101300 |
| NAME | AAAA | BBBB | ... | XXXX |
| E-MAIL ADDRESS | aaa@bbb.ccc | bbb@bbb.ccc | ... | xxx@bbb.ccc |
| LOG-IN ID | AA_AA | BB_BB | ... | XX_XX |
| LOG-IN PASSWORD | 12345 | abcdef | ... | xxxxx |
| RADIO TAG ID | 00522213 | 00535213 | ... | 05245219 |
| USER FEATURE INFORMATION | {222, 241, 52, ..., 40, -167, -58} | {56, 111, -3, ..., -120, 47, 208} | ... | {186, 241, -36, ..., 20, -67, 158} |
| ... | ... | ... | ... | ... |

| RADIO TAG ID | USER ID |
|---|---|
| 522213 | user_001 |
| 535213 | user_002 |
| ... | ... |
| 5245219 | user_300 |

| USER ID | USER FEATURE INFORMATION |
|---|---|
| user_001 | {222, 241, 52, ..., 40, -167, -58} |
| user_002 | {56, 111, -3, ..., -120, 47, 208} |
| ... | ... |
| user_300 | {186, 241, -36, ..., 20, -67, 158} |

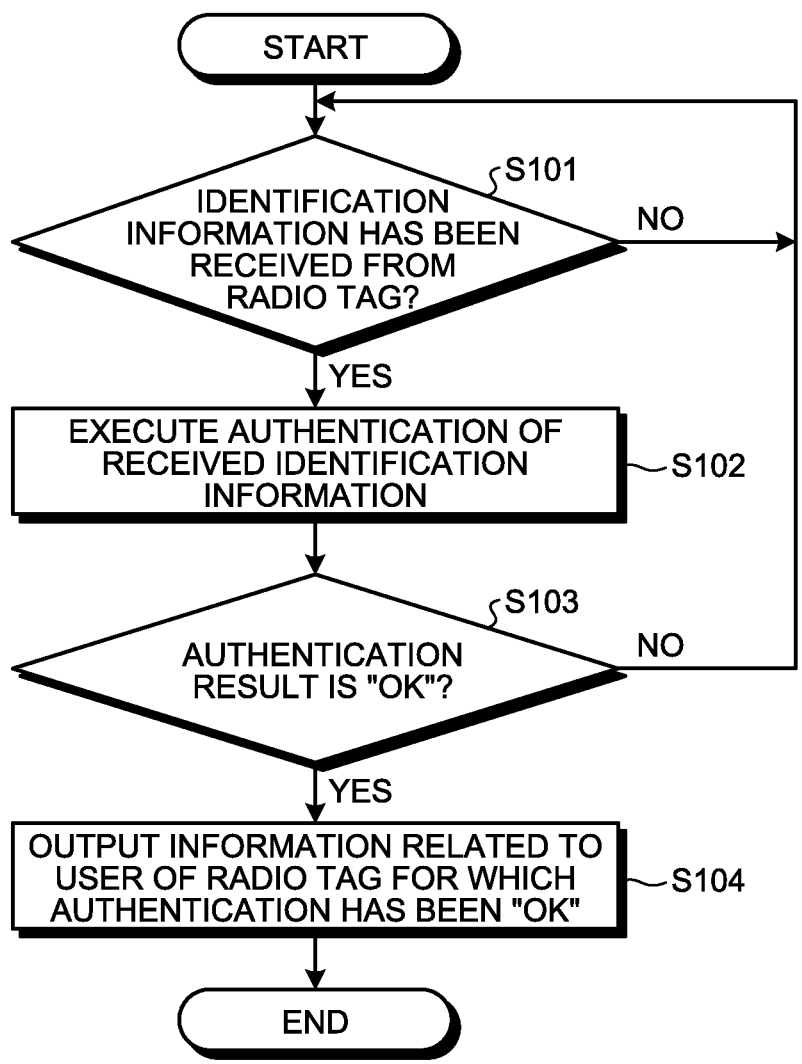

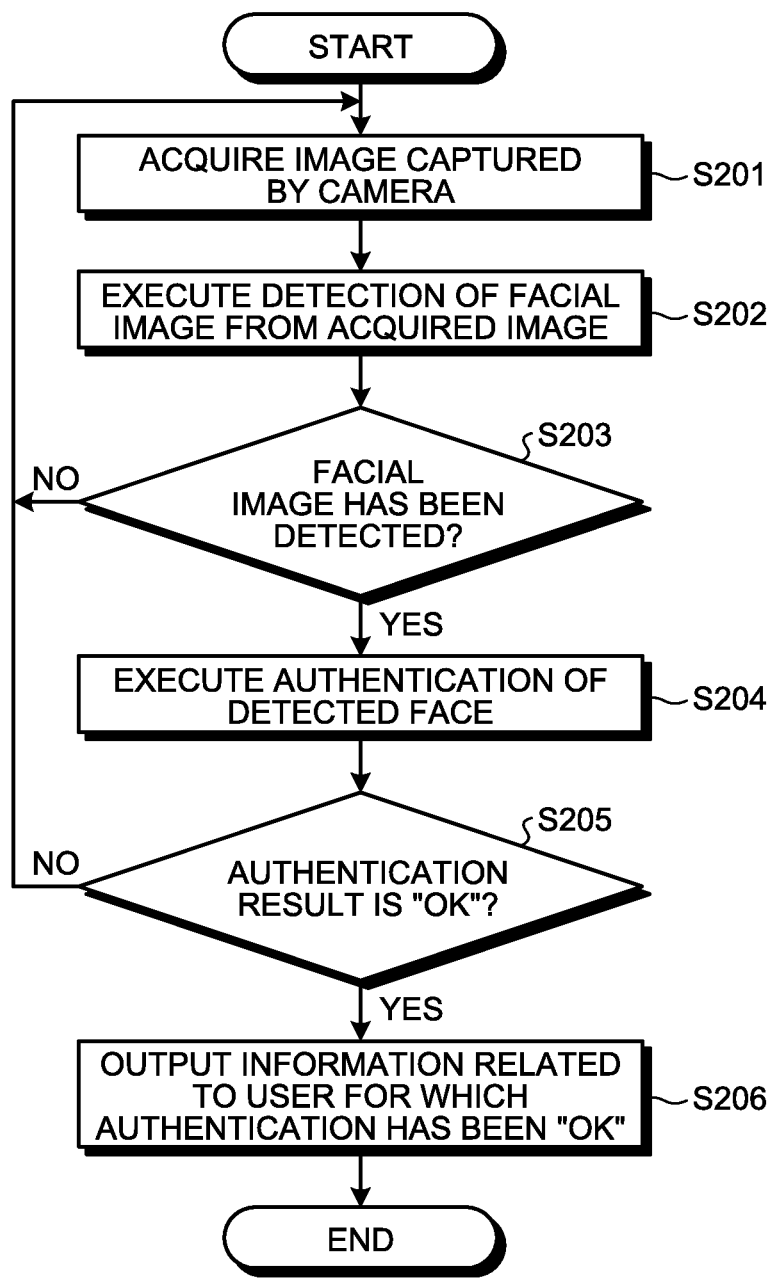

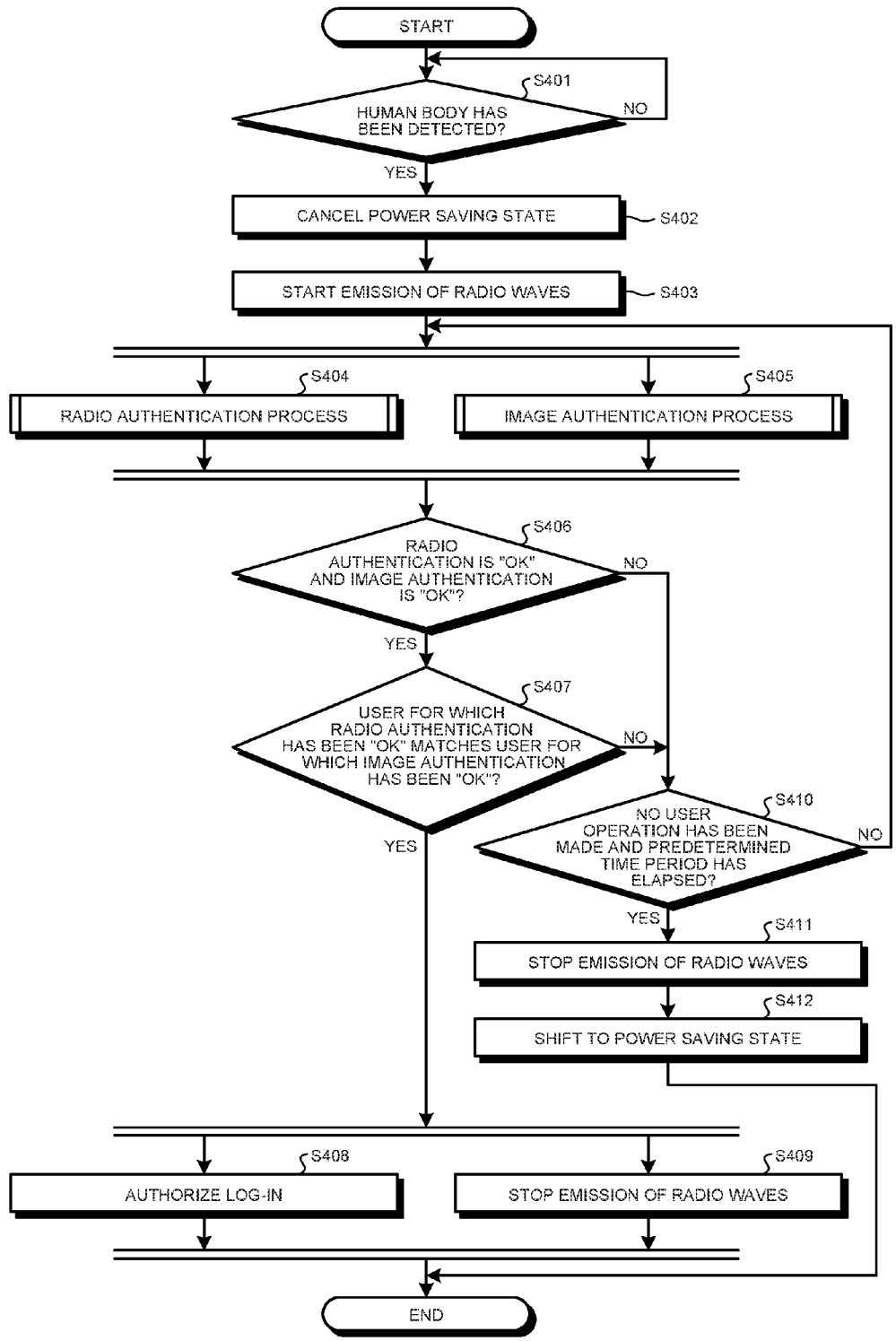

FIG.14

| TIME OF HUMAN BODY DETECTION | TIME OF START OF RADIO COMMUNICATION | TIME OF COMPLETION OF RADIO AUTHENTICATION | TIME OF COMPLETION OF IMAGE AUTHENTICATION |
|---|---|---|---|
| 2015/10/1 13:13:00.000 | 2015/10/1 13:13:02.150 | 2015/10/1 13:13:02.200 | 2015/10/1 13:13:02.800 |
| 2015/10/1 13:13:15.200 | 2015/10/1 13:13:17.252 | 2015/10/1 13:13:17.300 | 2015/10/1 13:13:17.900 |
| ... | ... | ... | ... |

900

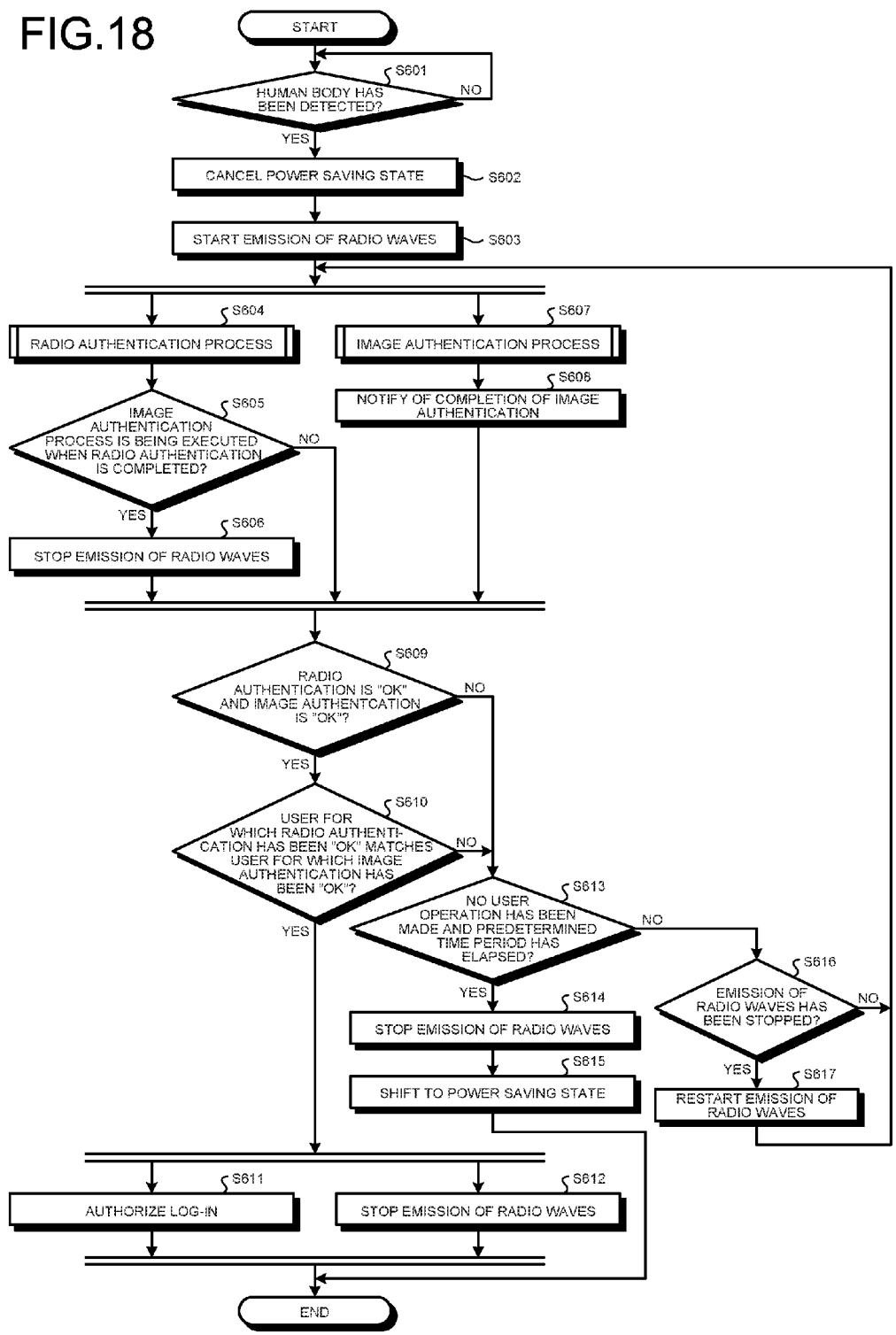

INFORMATION PROCESSING APPARATUS, INFORMATION PROCESSING SYSTEM, AUTHENTICATION METHOD, AND RECORDING MEDIUM

CROSS-REFERENCE TO RELATED APPLICATIONS

The present application claims priority under 35 U.S.C. § 119 to Japanese Patent Application No. 2016-018992, filed Feb. 3, 2016 and Japanese Patent Application No. 2016-201500, filed Oct. 13, 2016. The contents of which are incorporated herein by reference in their entirety.

BACKGROUND OF THE INVENTION

1. Field of the Invention

The present invention relates to an information processing apparatus, an information processing system, an authentication method, and a recording medium.

2. Description of the Related Art

Authentication techniques have recently been prevalent as authentication methods of authenticating users, the authentication techniques including: radio authentication by use of IC cards not requiring manipulation, such as input of passwords; and face authentication where authentication is executed based on facial images of users. As a radio authentication technique, for example, a technique has been proposed, which is for detecting, with radio waves, an object attached with a short range radio tag (a radio frequency identification (RFID) tag) or a user wearing that tag around the user's neck, using short range radio authentication, such as radio frequency identification (RFID) (see Japanese Unexamined Patent Application Publication No. 2005-258793).

However, the technique disclosed in Japanese Unexamined Patent Application Publication No. 2005-258793 has had a problem that with the authentication function using short range radio, for example, emission of radio waves is unable to be started at a timing when reading needs to be performed, such as a timing when a user carrying the tag has gotten closer to the RFID tag reader. Further, the technique also has had a problem that emission of radio waves is unable to be stopped at an appropriate timing when a particular tag has been identified. Furthermore, the technique also has had a problem that wasteful consumption of electric power resulting from emission of radio waves from the RFID reader is caused since timings to start and stop the emission of radio waves are not controlled as described above.

SUMMARY OF THE INVENTION

According to one aspect of the present invention, an information processing apparatus includes a detecting unit, a radio communication unit, a first authentication unit, an imaging unit, a second authentication unit, and an apparatus authentication unit. The detecting unit is configured to detect a user who is in a predetermined range. The radio communication unit is configured to start emission of radio waves for performing radio communication with a radio tag, and obtain specific information from the radio tag, at least after a time point at which the user is detected by the detecting unit. The first authentication unit is configured to execute first authentication for the radio tag, based on the specific information obtained by the radio communication unit. The imaging unit is configured to cause an imaging device to image a user, and acquire an image including the user. The second authentication unit is configured to execute second authentication for the user included in the image, based on feature information of the image acquired by the imaging unit. The apparatus authentication unit is configured to authorize the user to use the information processing apparatus, if a user of the radio tag authenticated by the first authentication is the same as the user authenticated by the second authentication.

BRIEF DESCRIPTION OF THE DRAWINGS

FIG. 6 is a diagram illustrating an example of user information according to the first embodiment;

FIGS. 7A and 7B are diagrams illustrating another example of the user information according to the first embodiment;

FIG. 8 is a flow chart illustrating an example of a radio authentication process of the image forming apparatus according to the first embodiment;

FIG. 9 is a flow chart illustrating an example of an image authentication process of the image forming apparatus according to the first embodiment;

FIG. 11 is a flow chart illustrating an example of an authentication process of the image forming apparatus according to the first embodiment;

FIG. 14 is a diagram illustrating an example of time information according to the second embodiment;

FIG. 18 is a flow chart illustrating an example of an authentication process of the image forming apparatus according to the third embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
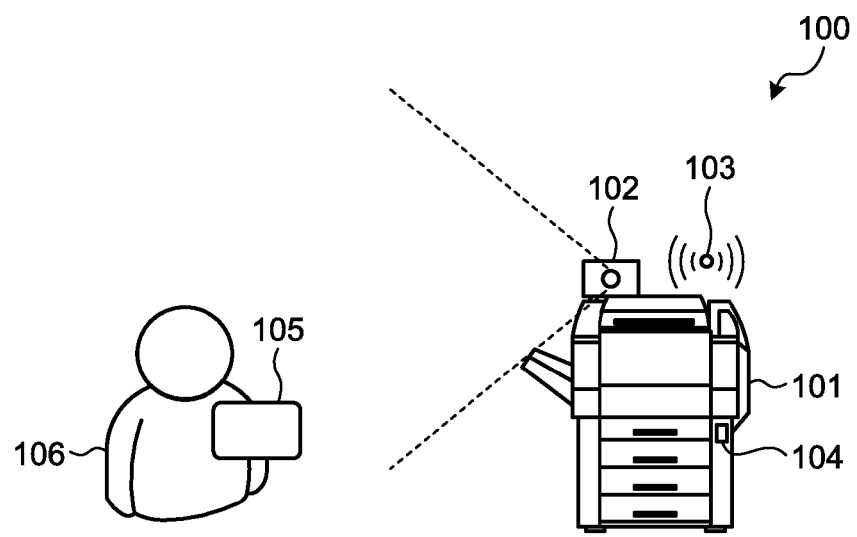
FIG. 1 is a view illustrating an example of a configuration of an information processing system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an information processing apparatus, an information processing system, an authentication method, and a recording medium which enable consumption of electric power resulting from emission of radio waves from an RFID reader to be reduced.

First Embodiment

Hereinafter, by reference to FIG. 1 to FIG. 12, a first embodiment will be described.

System Configuration

FIG. 1 is a view illustrating an example of a configuration of an information processing system according to the first embodiment. By reference to FIG. 1, a configuration of an information processing system 100 according to this embodiment will be described.

As illustrated in FIG. 1, the information processing system 100 includes an image forming apparatus 101, and an RFID tag 105 carried by a user 106.

The image forming apparatus 101 is an image forming apparatus, such as, for example, a multifunction peripheral (MFP), a copying machine, a printer, a facsimile device, or a scanner device, and is an example of an "information processing apparatus" of the present invention. The MFP is a multifunction peripheral having at least two of: a copy function; a printer function; a scanner function; and a facsimile function. The image forming apparatus 101 includes: a camera 102 that captures an image; an RFID tag reader 103 that receives specific information, such as a radio tag ID, from the RFID tag 105 that is present in a predetermined range (for example, a radio detection range 202 illustrated in FIG. 2 described later); and a human body detecting sensor 104 that detects a user or the like. RFID is a technique for performing short range radio communication by use of electromagnetic waves or radio waves, between the RFID tag 105 storing therein the specific information, such as the radio tag ID, and the RFID tag reader 103, and is an example of a short range radio communication technique.

The camera 102 is, for example, an imaging device installed, such that the captured image includes the user 106 that uses the image forming apparatus 101.

The RFID tag reader 103 is, for example, a device that emits radio waves over the later described predetermined detection range (radio detection range 202) and receives the specific information from the RFID tag 105, if the RFID tag 105 is a passive tag. Further, when the RFID tag 105 receives the radio waves emitted from the RFID tag reader 103, the RFID tag 105 operates with the received radio waves serving as electric power, and transmits the specific information prestored therein, such as the radio tag ID, to the RFID tag reader 103. An RFID tag reader of a specified low power standard with a use frequency of a 920 [MHz] band and a transmission output equal to or less than 250 [mW], may be adopted, for example, as the RFID tag reader 103. If plural RFID tags 105 are present in the detection range, the RFID tag reader 103 is able to receive the specific information, such as the radio tag ID, from each of the RFID tags 105.

A passive tag is a tag for RFID, the tag operating with radio waves from an RFID tag reader serving as an energy source thereof, and does not need to have a built-in battery. An antenna of a passive tag reflects a part of the radio waves from the RFID tag reader and returns information, such as the radio tag ID, via the reflected radio waves. Since intensity of this reflection is very small, communication ranges of passive tags are shorter than of active tags that transmit radio waves with the active tags' own electric power, but passive tags are inexpensive and operate substantially permanently.

The human body detecting sensor 104 is a pyroelectric sensor or the like that detects a human body, such as the user 106.

Figure 2:
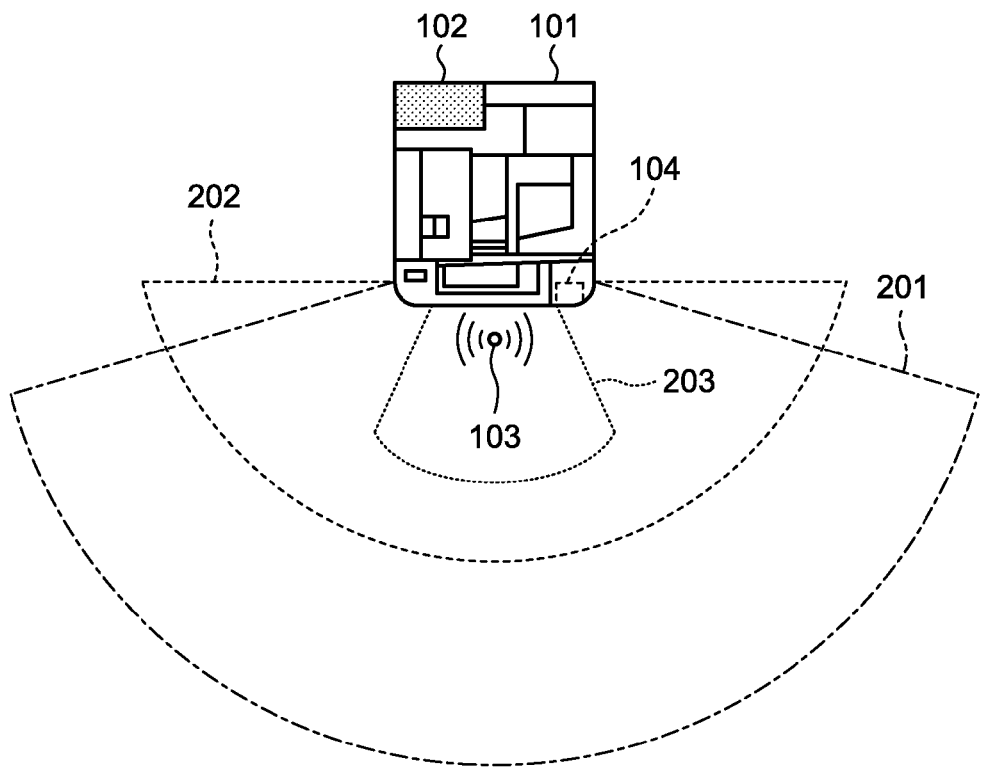
FIG. 2 is a view illustrating an example of a detection range of an RFID tag reader and a detection range of a human body detecting sensor.

FIG. 2 is a view illustrating an example of a detection range of an RFID tag reader and a detection range of a human body detecting sensor. By reference to FIG. 2, a detection range of the RFID tag reader 103 and a detection range of the human body detecting sensor 104 will be described.

In FIG. 2, a sensor detection range 201 of the human body detecting sensor 104, the radio detection range 202 of the RFID tag reader 103, and an image authentication range 203 of the camera 102, as viewed from an upper surface of the image forming apparatus 101, are illustrated.

In the example of FIG. 2, the human body detecting sensor 104 is installed at a front side (a lower side in FIG. 2) of the image forming apparatus 101, and the sensor detection range 201, which is fan-shaped, is formed over a front surface of the image forming apparatus 101 (in a downward direction in FIG. 2). The sensor detection range 201 of the human body detecting sensor 104 targets a range of about 2 [m], for example, from the image forming apparatus 101, and when a person (the user 106, or the like) enters this sensor detection range 201, presence of this person is detected by the human body detecting sensor 104 and operation of the camera 102 and the RFID tag reader 103 is started.

Further, the image forming apparatus 101 has, inside thereof, the RFID tag reader 103, such as a patch antenna, for example, and the radio detection range 202, which is fan-shaped, is formed over the front surface of the image forming apparatus 101 (in the downward direction in FIG. 2). The radio detection range 202 of the RFID tag reader 103 is practically a detection range of about 1 [m] because of degradation in the communication function due to the RFID tag 105 and the user 106 approaching each other, even if the RFID tag reader 103 has detection performance of about 2 [m], for example, from the image forming apparatus 101. This radio detection range 202 is formed by the RFID tag reader 103 emitting the radio waves in order to receive predetermined information (for example, the radio tag ID) from the RFID tag 105. When the user 106 carrying the RFID tag 105 enters the radio detection range 202, the specific information stored in the RFID tag 105 is transmitted automatically to the image forming apparatus 101.

Further, in FIG. 2, the image authentication range 203, which is an imaging range where face authentication is possible from the captured image imaged by the camera 102, is illustrated.

In this embodiment, the image forming apparatus 101 stores therein, as described later, preregistered information indicating users, and executes, based on the radio tag ID received from the RFID tag 105 and the information indicating users preregistered in a storage unit of the image forming apparatus 101, authentication of the RFID tag 105 (which may, hereinafter, be referred to as "radio authentication") (first authentication). Further, the image forming apparatus 101 executes, based on, for example, a facial image of the user 106 included in the image captured by the camera 102 and later described feature information of faces of the users preregistered in the storage unit of the image forming apparatus 101, authentication of the user 106 captured in the image (which may, hereinafter, be referred to as "image authentication") (second authentication). Furthermore, if the radio authentication and the image authentication have been successful, based on information indicating a user corresponding to the RFID tag 105 authenticated by the radio authentication, and information indicating the user authenticated by the image authentication, the image forming apparatus 101 executes log-in authentication for authorizing the user 106 to use the image forming apparatus 101 (which may, hereinafter, be referred to as "apparatus authentication"). For example, if the user of the RFID tag 105 authenticated by the radio authentication is the same as the user authenticated by the image authentication, the image forming apparatus 101 authorizes the user to log into the image forming apparatus 101.

As described above, the image forming apparatus 101 authorizes log-in of a user, if both of radio authentication using the RFID tag 105 and image authentication using a facial image captured by the camera 102 are successful, and a user of the RFID tag 105 authenticated by the radio authentication and a user authenticated by the image authentication are the same user. Thereby, the image forming apparatus 101 according to this embodiment enables authentication accuracy of the authentication method, such as the image authentication, to be improved, the authentication method using the captured image, just by the user 106 of the image forming apparatus 101 carrying the RFID tag 105.

The system configuration in FIG. 1 is just an example. For example, in FIG. 1, the image forming apparatus 101 is illustrated as an example of the information processing apparatus, but not being limited thereto, the information processing apparatus may be a personal computer (PC), a tablet terminal, a smartphone, a game machine, or a video conference apparatus, which has the same authentication functions as the image forming apparatus 101 for users.

Further, the camera 102, the RFID tag reader 103, the human body detecting sensor 104, or the like may be externally attached outside.

Further, the RFID tag 105 may be an active tag or a semi-active tag, of RFID. Furthermore, the RFID tag 105 is an example of a radio tag. The radio tag may be a radio terminal that performs communication by a short range radio scheme different from RFID (for example, Bluetooth (registered trademark) Low Energy (hereinafter, referred to as "BLE"), or near field communication (NFC)). Moreover, instead of the radio tag, a portable terminal or the like mounted with a radio tag or the like may be used.

Further, the image authentication uses an image capturing a user, but not being limited thereto, the image authentication may be any of various authentication methods of performing authentication of a user by use of feature information indicating biological features of the user (for example, fingerprint authentication, iris authentication, or vein authentication).

Hardware Configuration

Figure 3:
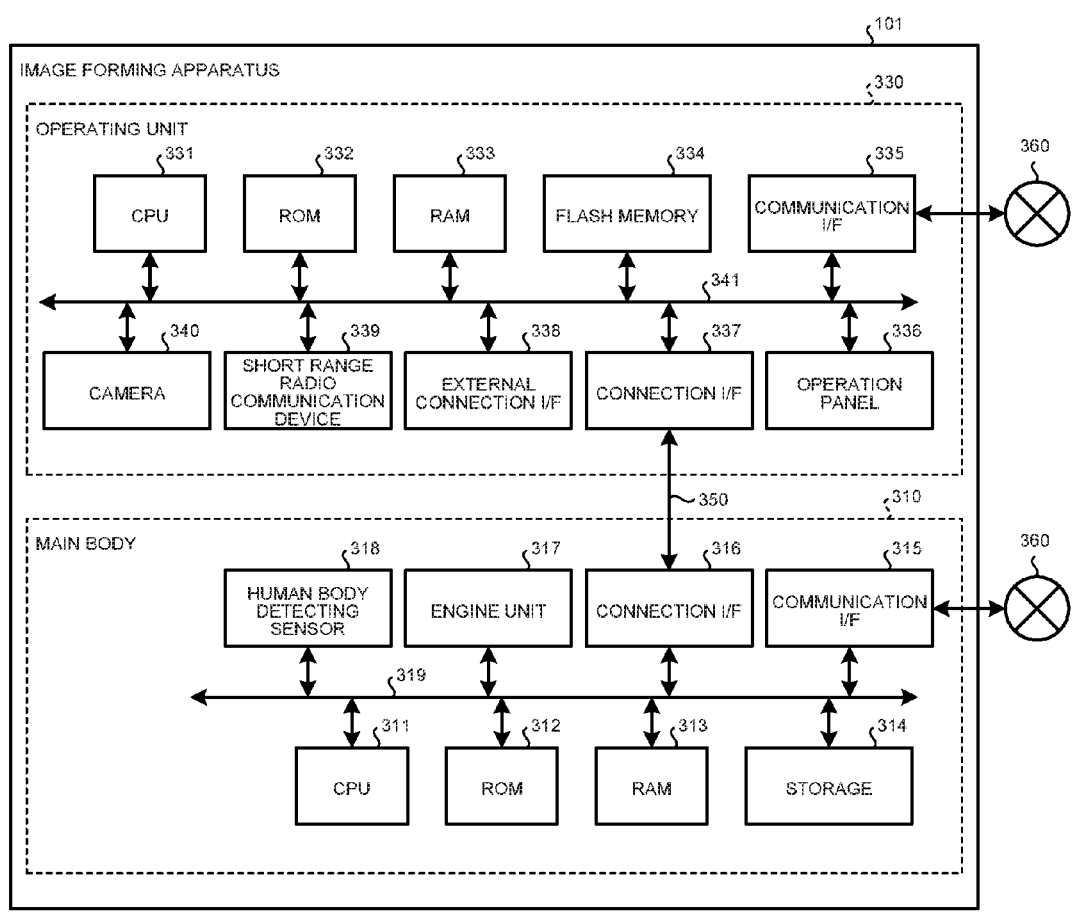
FIG. 3 is a diagram illustrating an example of a hardware configuration of an image forming apparatus according to the first embodiment.

FIG. 3 is a diagram illustrating an example of a hardware configuration of the image forming apparatus according to the first embodiment. By reference to FIG. 3, a hardware configuration of the image forming apparatus 101 according to this embodiment will be described.

As illustrated in FIG. 3, the image forming apparatus 101 includes, for example: a main body 310 that realizes various image forming functions, such as a copy function, a scanner function, a facsimile function, and a printer function; and an operating unit 330 that receives an operation of a user. Receiving an operation of a user is a concept including receiving information (including a signal indicating coordinate values on a screen) that is input according to an operation of a user.

The main body 310 and the operating unit 330 are connected communicatably with each other via a communication path 350 dedicated thereto. The communication path 350 of, for example, the Universal Serial Bus (USB) standard may be used, but not being limited thereto, and the communication path 350 of any standard regardless of being wired or wireless may be used. The main body 310 performs operation according to the operation received by the operating unit 330. Further, the main body 310 is communicatable with an external device, such as a client PC, and is able to perform operation according to an instruction received from the external device.

Hardware Configuration of Main Body

As illustrated in FIG. 3, the main body 310 has a central processing unit (CPU) 311, a read only memory (ROM) 312, a random access memory (RAM) 313, a storage 314, a communication interface (I/F) 315, a connection I/F 316, an engine unit 317, a human body detecting sensor 318, and a system bus 319.

The CPU 311 integrally controls the operation of the main body 310. The CPU 311 uses the RAM 313 as a work area to execute a program stored in the ROM 312 or the storage 314, to control the operation of the whole main body 310. For example, the CPU 311 realizes various functions, such as the above mentioned copy function, scanner function, facsimile function, and printer function.

The ROM 312 is, for example, a non-volatile memory storing therein: a Basic Input/Output System (BIOS) executed upon starting of the main body 310; various settings; and the like. The RAM 313 is a volatile memory used as the work area of the CPU 311. The storage 314 is, for example, a non-volatile storage device storing therein an operating system (OS), an application program, and various data. The storage 314 is formed of, for example, a hard disk drive (HDD), or a solid state drive (SSD).

The communication I/F 315 is a network interface for connecting the main body 310 to a network 360, and performing communication with an external device connected to the network 360. The connection I/F 316 is an interface for communication with the operating unit 330 via the communication path 350.

The engine unit 317 is hardware that is for realizing functions, such as the copy function, the scanner function, the facsimile function, and the printer function, and that executes processing, other than generic information processing and communication. The engine unit 317 includes, for example: a scanner unit that scans and reads an image of a document; a plotter unit that performs printing onto a sheet material, such as a sheet of paper; and a facsimile unit that performs facsimile communication. The engine unit 317 may include a specific option, such as a finisher that sorts out printed sheet materials, or an auto document feeder (ADF) that automatically feeds documents.

The human body detecting sensor 318 is a sensor that detects a human body (user) that is present in a detection range around the image forming apparatus 101 (the sensor detection range 201 illustrated in FIG. 2). The human body detecting sensor 318 is formed of, for example, a pyroelectric sensor. The human body detecting sensor 318 corresponds to the human body detecting sensor 104 illustrated in FIG. 1.

The system bus 319 is a transmission line, which connects the above described components to one another, and transmits address signals, data signals, various control signals, and the like.

Hardware Configuration of Operating Unit

As illustrated in FIG. 3, the operating unit 330 has a CPU 331, a ROM 332, a RAM 333, a flash memory 334, a communication I/F 335, an operation panel 336, a connection I/F 337, an external connection I/F 338, a short range radio communication device 339, a camera 340 (an imaging device), and a system bus 341.

The CPU 331 integrally controls operation of the operating unit 330. The CPU 331 uses the RAM 333 as a work area to execute a program stored in the ROM 332 or the flash memory 334, to control the operation of the whole operating unit 330. For example, the CPU 331 realizes various functions including a function of causing the operation panel 336 to display information (an image) according to an input received from a user.

The ROM 332 is, for example, a non-volatile memory storing therein a BIOS executed upon starting of the operating unit 330, various settings, and the like. The RAM 333 is a volatile memory used as the work area of the CPU 331. The flash memory 334 is, for example, a non-volatile storage device storing therein, an OS, an application program, and various data.

The communication I/F 335 is a network interface for connecting the operating unit 330 to the network 360, and performing communication with an external device connected to the network 360.

The operation panel 336 is a device that has an input function and a display function, for receiving various inputs according to operations of a user, and displaying various types of information (for example, information according to a received operation, information indicating an operating situation of the image forming apparatus 101, and setting information). The operation panel 336 is formed of, for example, a liquid crystal display (LCD) having a touch panel function installed therein. The operation panel 336 is not limited to the liquid crystal display, and may be formed of, for example, a display device of organic electro-luminescence (EL) having a touch panel function installed therein. Further, the operation panel 336 may have, in addition to, or instead of, the touch panel function, an operating section, such as a hardware key, or a display section, such as a lamp, provided therein.

The connection I/F 337 is an interface for performing communication with the main body 310 via the communication path 350. The external connection I/F 338 is, for example, an interface of the USB, or the like, for connecting the external device.

The short range radio communication device 339 is a short range radio device for performing communication with a radio tag in the predetermined range (the radio detection range 202 illustrated in FIG. 2) by short range radio communication. The short range radio communication device 339 includes, for example, the RFID tag reader 103 illustrated in FIG. 1, and receives the specific information from the RFID tag 105 that returns a response to the emitted radio waves. The short range radio communication device 339 may be a short range radio device that performs short range radio communication, such as the above mentioned BLE or NFC.

The camera 340 is an imaging device that captures an image in a predetermined imaging range (the image authentication range 203 illustrated in FIG. 2). The camera 340 corresponds to the camera 102 illustrated in FIG. 1.

The system bus 341 is a transmission line, which connects the above described components to one another, and transmits address signals, data signals, various control signals, and the like.

Software Configuration

Figure 4:
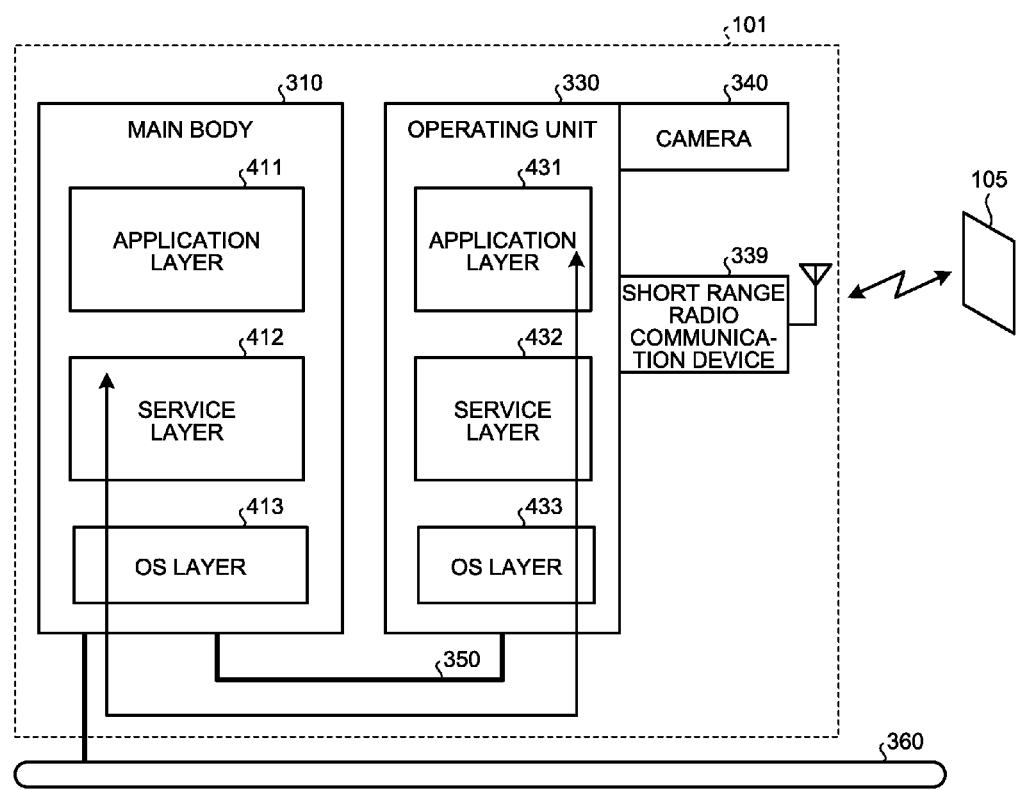
FIG. 4 is a diagram illustrating an example of a software configuration of the image forming apparatus according to the first embodiment.

FIG. 4 is a diagram illustrating an example of a software configuration of the image forming apparatus according to the first embodiment. By reference to FIG. 4, a software configuration of the image forming apparatus 101 according to this embodiment will be described.

As illustrated in FIG. 4, the main body 310 of the image forming apparatus 101 includes an application layer 411, a service layer 412, and an OS layer 413. The application layer 411, the service layer 412, and the OS layer 413 are tangibly various pieces of software stored in the ROM 312, the storage 314, or the like. By the CPU 311 executing these pieces of software (programs), various functions of the main body 310 are provided.

The application layer 411 is application software (which may, hereinafter, be simply referred to as "applications") for causing hardware resources to operate to provide predetermined functions. Examples of the applications include: a copy application for providing the copy function; a scanner application for providing the scanner function; a facsimile application for providing the facsimile function; and a printer application for providing the printer function.

The service layer 412 is interposed between the application layer 411 and the OS layer 413, and is software providing, to the applications of the application layer 411, an interface for utilizing the hardware resources included in the main body 310. Specifically, the service layer 412 provides a function of receiving operation requests to the hardware resources and performing arbitration of the operation requests. Examples of the operation requests received by the service layer 412 include a request for reading by use of a scanner and a request for printing by use of a plotter. The interface function of the service layer 412 is provided, not only to the application layer 411 of the main body 310, but also to an application layer 431 of the operating unit 330. That is, the application layer 431 of the operating unit 330 is also able to realize functions utilizing the hardware resources (for example, the engine unit 317) of the main body 310 via the interface function of the service layer 412 of the main body 310.

The OS layer 413 is basic software (operating system) for providing basic functions of controlling the hardware included in the main body 310. The service layer 412 converts requests for utilization of the hardware resources from various applications to commands interpretable by the OS layer 413 and transfers the converted commands to the OS layer 413. By the commands being executed by the OS layer 413, the hardware resources perform operation according to the requests of the applications.

As illustrated in FIG. 4, the operating unit 330 of the image forming apparatus 101 includes the application layer 431, a service layer 432, and an OS layer 433. A hierarchic structure of the application layer 431, the service layer 432, and the OS layer 433 included in the operating unit 330 is similar to the hierarchic structure in the main body 310. However, functions provided by applications of the application layer 431 and types of operation requests receivable by the service layer 432 are different from the main body 310.

The applications of the application layer 431 may be software for causing the hardware resources included in the operating unit 330 to operate to provide predetermined functions, but mainly provide user interface (UI) functions for performing operation and display related to the functions included in the main body 310. Further, the applications of the application layer 431 provide authentication functions using the short range radio communication device 339 and the camera 340 included in the operating unit 330.

In this embodiment, in order to keep independence of the functions, the software of the OS layer 413 of the main body 310 and the software of the OS layer 433 of the operating unit 330 are different from each other. That is, the main body 310 and the operating unit 330 are operated independently of each other by separate operating systems. For example, Linux (registered trademark) may be used as the software of the OS layer 413 of the main body 310 and Android (registered trademark) may be used as the software of the OS layer 433 of the operating unit 330.

As described above, in the image forming apparatus 101 of this embodiment, since the main body 310 and the operating unit 330 operate with separate operating systems, communication between the main body 310 and the operating unit 330 is performed as communication between different devices, rather than communication between processes within a device common to the main body 310 and the operating unit 330. This communication includes an operation (command communication) of transmitting information (contents of an operation instruction from a user) received by the operating unit 330 to the main body 310, an operation of transmitting information from the main body 310 to the operating unit 330, and the like. By performing the command communication with the main body 310, the operating unit 330 is able to use the functions of the main body 310. Further, the information transmitted from the main body 310 to the operating unit 330 includes, for example, an execution situation of operation in the main body 310 and contents set in the main body 310. Furthermore, in this embodiment, since electric power supply to the operating unit 330 is performed via the communication path 350 from the main body 310, power supply control for the operating unit 330 is able to be performed separately from (independently of) power supply control for the main body 310.

Functional Configuration

Figure 5:
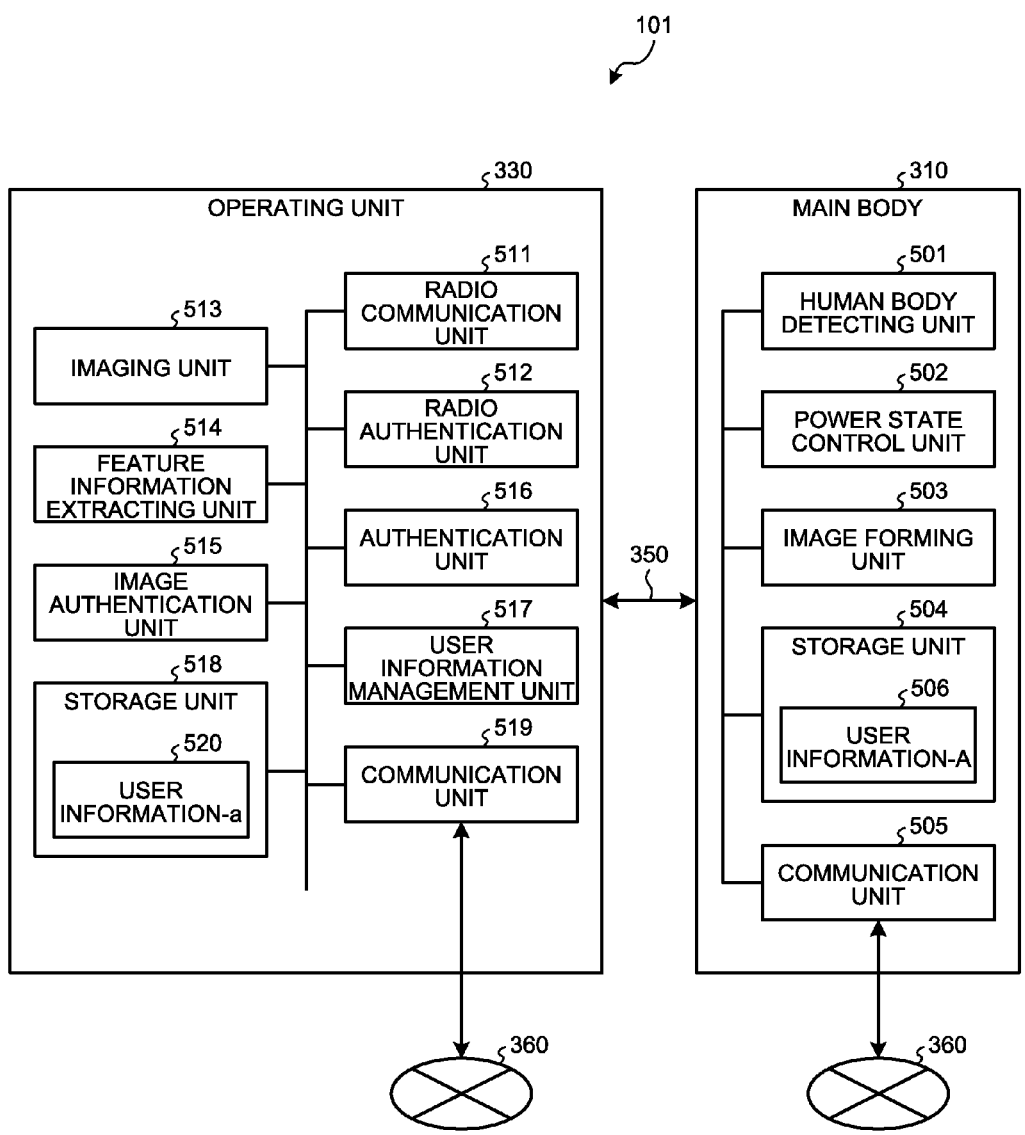
FIG. 5 is a diagram illustrating an example of a functional configuration of the image forming apparatus according to the first embodiment.

FIG. 5 is a diagram illustrating an example of a functional configuration of the image forming apparatus according to the first embodiment. By reference to FIG. 5, a functional configuration of the image forming apparatus 101 according to this embodiment will be described.

Functional Configuration of Main Body

As illustrated in FIG. 5, the main body 310 of the image forming apparatus 101 has a human body detecting unit 501 (detecting unit), a power state control unit 502 (power state control unit), an image forming unit 503, a storage unit 504, and a communication unit 505.

The human body detecting unit 501 is a functional unit that detects, using the human body detecting sensor 318, a person (the user 106, in the example of FIG. 1) in a detection range around the image forming apparatus 101. The human body detecting unit 501 is realized by, for example, a program operated by the CPU 311 illustrated in FIG. 3. If the human body detecting unit 501 detects a person in the detection range, the human body detecting unit 501 notifies the power state control unit 502 of that detection information, and further, notifies, via the communication path 350, a radio communication unit 511 of the detection information.

The power state control unit 502 is a functional unit that controls power states of the main body 310 and the operating unit 330. The power state control unit 502 is realized by, for example, a program operated by the CPU 311 illustrated in FIG. 3. The power state control unit 502 causes the image forming apparatus 101 to shift to a power saving state where electric power consumption is less than in a normal state where image formation processing is possible, if the image forming apparatus 101 has not been used for more than a preset time period. In the power saving state, for example, the electric power consumption is able to be reduced by stopping the functions of the operating unit 330 and the engine unit 317 of the main body 310. Further, the power state control unit 502 restores the main body 310 to a normal state where normal operation is possible, from the power saving state, if a notification of detection information indicating that a person has been detected is received from the human body detecting unit 501 when the image forming apparatus 101 is in the power saving state. Further, the power state control unit 502 notifies the operating unit 330 of a restoration instruction, via the communication path 350, to restore the operating unit 330 from the power saving state to a normal state.

The image forming unit 503 is a functional unit that executes the various image forming functions included in the image forming apparatus 101 (for example, the printer function, the copy function, the scanner function, and the facsimile function). The image forming unit 503 is realized by, for example, the engine unit 317 illustrated in FIG. 3, and a program operated by the CPU 311 illustrated in FIG. 3.

The storage unit 504 is a functional unit that stores therein various pieces of information, such as user information-A 506 including information indicating preregistered users of the image forming apparatus 101. The storage unit 504 is realized by, for example, the RAM 313 and the storage 314, which are illustrated in FIG. 3, and a program operated by the CPU 311 illustrated in FIG. 3.

The communication unit 505 is a functional unit that connects the main body 310 to the network 360, and performs communication with an external device connected to the network 360. The communication unit 505 is realized by, for example, the communication I/F 315 illustrated in FIG. 3, and a program operated by the CPU 311 illustrated in FIG. 3.

The human body detecting unit 501, the power state control unit 502, the image forming unit 503, the storage unit 504, and the communication unit 505 of the main body 310 illustrated in FIG. 5 represent their functions conceptually, and are not limited to such a configuration. For example, more than one of the functional units illustrated as independent functional units in the main body 310 illustrated in FIG. 5 may be formed as a single functional unit. On the contrary, a function that any one of the functional units in the main body 310 illustrated in FIG. 5 has may be divided into plural functions and be configured as plural functional units.

Further, a part or all of the human body detecting unit 501, the power state control unit 502, and the image forming unit 503, of the main body 310, may be realized by a hardware circuit, such as a field-programmable gate array (FPGA) or an application specific integrated circuit (ASIC), instead of by programs, which are software.

Functional Configuration of Operating Unit

As illustrated in FIG. 5, the operating unit 330 of the image forming apparatus 101 has the radio communication unit 511 (radio communication unit), a radio authentication unit 512 (first authentication unit), an imaging unit 513 (imaging unit), a feature information extracting unit 514, an image authentication unit 515 (second authentication unit), an authentication unit 516 (apparatus authentication unit), a user information management unit 517, a storage unit 518, and a communication unit 519.

The radio communication unit 511 is a functional unit that receives the specific information from the radio tag in the predetermined range by short range radio communication using the short range radio communication device 339. The radio communication unit 511 emits radio waves in order to receive the specific information from the radio tag, when the radio communication unit 511 receives, from the human body detecting unit 501, the detection information indicating that a person has been detected. The radio communication unit 511 is realized by, for example, the short range radio communication device 339 illustrated in FIG. 3, and a program operated by the CPU 331 illustrated in FIG. 3. The radio communication unit 511 receives the specific information, such as the radio tag ID, from the RFID tag 105 that is present in the radio detection range 202 illustrated in FIG. 2 formed by the emission of radio waves. If plural RFID tags 105 are present in the radio detection range 202, the radio communication unit 511 is able to receive the specific information, such as the radio tag ID, from each of the RFID tags 105.

The radio authentication unit 512 is a functional unit that executes authentication of the radio tag that has transmitted the specific information, based on the specific information received by the radio communication unit 511 and the preregistered user information. The radio authentication unit 512 is realized by, for example, a program operated by the CPU 331 illustrated in FIG. 3. The radio authentication unit 512 executes authentication (radio authentication) of the RFID tag 105, based on the radio tag ID of the RFID tag 105 received by the radio communication unit 511 and the preregistered user information (for example, user information-a 520 and the user information-A 506, which will be described later). The radio authentication unit 512 authenticates the RFID tag 105 in the authentication, if the radio tag ID of the RFID tag 105 received by the radio communication unit 511 is included in the preregistered user information. Further, the radio authentication unit 512 outputs information indicating the user of the RFID tag 105 authenticated by the authentication, to the authentication unit 516. The radio authentication unit 512 may output the information indicating the user of the RFID tag 105 authenticated by the authentication to the storage unit 518 and cause the storage unit 518 to store the information therein, in order to retain the information. Further, if radio tag IDs are respectively received from plural RFID tags 105 by the radio communication unit 511, the radio authentication unit 512 may sequentially execute radio authentication for the plural radio tag IDs and retain results of the radio authentication.

The imaging unit 513 is a functional unit that captures an image using the camera 340. The imaging unit 513 is realized by, for example, a program operated by the CPU 331 illustrated in FIG. 3. The imaging unit 513 captures an image in front of the image forming apparatus 101 to capture an image of the user 106 who is in front of the image forming apparatus 101.

The feature information extracting unit 514 is a functional unit that extracts, if a facial image is included in the image captured by the imaging unit 513, the facial image and feature information of the facial image (an example of feature information indicating features of a user). The feature information extracting unit 514 is realized by, for example, a program operated by the CPU 331 illustrated in FIG. 3. The feature information of the facial image includes, for example, information on shapes of and relative positions among, respective parts, such as the facial outline, eyes, nose, chin, and cheekbones. A known face detection method or the like based on Haar-like features may be applied as a method of detecting a facial image in a captured image by use of the feature information extracting unit 514.

The image authentication unit 515 is a functional unit that executes authentication of a user included in an image captured by the imaging unit 513, based on the image captured by the imaging unit 513 and the preregistered user information. The image authentication unit 515 is realized by, for example, a program operated by the CPU 331 illustrated in FIG. 3. The image authentication unit 515 executes, based on the feature information of the facial image of the user, the feature information extracted by the feature information extracting unit 514 from the image captured by the imaging unit 513, and the preregistered user information (for example, the later described user information-a 520 and the user information-A 506), image authentication of the user included in the image. The image authentication unit 515 authenticates the user included in the image in the authentication, if one set of feature information corresponding to the feature information of the facial image is included in the preregistered user information, the feature information being extracted by the feature information extracting unit 514. Further, the image authentication unit 515 outputs information indicating the user authenticated by the authentication, to the authentication unit 516. The image authentication unit 515 may output the information indicating the user authenticated by the authentication, to the storage unit 518 and cause the storage unit 518 to store therein the information, in order to retain the information.

In this embodiment, the image authentication unit 515 preferably performs image authentication of a user using a known face authentication technique (for example, see Japanese Unexamined Patent Application Publication No. 2015-35178). Further, based on feature information indicating biological features of a user included in an image captured by the imaging unit 513, the image authentication unit 515 may execute authentication of the user by any of various known image authentication methods (for example, fingerprint authentication, iris authentication, or vein authentication) for authentication of users.

The authentication unit 516 is a functional unit that executes, based on the information indicating the user authenticated by the authentication by the radio authentication unit 512 and the information indicating the user authenticated by the authentication by the image authentication unit 515, log-in authentication (apparatus authentication) of the user. The authentication unit 516 is realized by, for example, a program operated by the CPU 331 illustrated in FIG. 3. If the user of the radio tag (RFID tag 05) authenticated by the authentication by the radio authentication unit 512 is the same user as the user authenticated by the authentication by the image authentication unit 515, the authentication unit 516 authorizes the user to use the image forming apparatus 101. In a preferable example, if the identification information of the user of the radio tag authenticated by the authentication by the radio authentication unit 512 matches the identification information of the user authenticated by the authentication by the image authentication unit 515, the authentication unit 516 authorizes the user to use the image forming apparatus 101.

On the contrary, a specific example of a case where identification information of a user of a radio tag authenticated by authentication by the radio authentication unit 512 does not match identification information of a user authenticated by authentication by the image authentication unit 515 would be a case where a user having the RFID tag 105 passes the periphery of the image forming apparatus 101 and a user, who does not have the RFID tag 105, but for whom user feature information in FIG. 6 described later has been registered, is in front of the image forming apparatus 101. In this case, the authentication unit 516 does not authorize the log-in.

Cases where the identification information of the user obtained from the radio authentication unit 512 matches the identification information of the user obtained from the image authentication unit 515 may not only include the case where the two pieces of identification information completely match each other, but also a case where the two pieces of identification are able to be substantially determined to be identification information of the same user. For example, if identification information of a user obtained by the image authentication unit 515 is an eight-digit employee ID, and identification information of a user obtained by the radio authentication unit 512 is a ten-digit log-in ID added up of the employee ID and two characters, the two pieces of identification information may be determined to be matching each other. As described above, if identification information of a user obtained from the radio authentication unit 512 and identification information of a user obtained from the image authentication unit 515 are identification information related to the same user, the authentication unit 516 may authorize that user to use the image forming apparatus 101.

The user information management unit 517 is a functional unit that manages the user information-a 520 stored in the storage unit 518. The user information management unit 517 is realized by, for example, a program operated by the CPU 331 illustrated in FIG. 3.

The storage unit 518 is a functional unit that stores therein various types of information, such as the user information-a 520 including information indicating users of the image forming apparatus 101. The storage unit 518 is realized by, for example, the RAM 333 and the flash memory 334, which are illustrated in FIG. 3, and a program or the like operated by the CPU 331 illustrated in FIG. 3.

The communication unit 519 is a functional unit that connects the operating unit 330 to the network 360, and performs communication with an external device connected to the network 360. The communication unit 519 is realized by, for example, the communication I/F 335 illustrated in FIG. 3, and a program or the like operated by the CPU 331 illustrated in FIG. 3.

The radio communication unit 511, the radio authentication unit 512, the imaging unit 513, the feature information extracting unit 514, the image authentication unit 515, the authentication unit 516, the user information management unit 517, the storage unit 518, and the communication unit 519, of the operating unit 330 illustrated in FIG. 5 conceptionally represent their functions, and are not limited to such a configuration. For example, more than one of the functional units illustrated as independent functional units in the operating unit 330 illustrated in FIG. 5 may be configured as a single functional unit. On the contrary, the function that one of the functional units in the operating unit 330 illustrated in FIG. 5 has may be divided into plural functions, and be configured as plural functional units.

Further, a part or all of the radio communication unit 511, the radio authentication unit 512, the imaging unit 513, the feature information extracting unit 514, the image authentication unit 515, the authentication unit 516, and the user information management unit 517, of the operating unit 330 may be realized by a hardware circuit, such as an FPGA or ASIC, instead of a program, which is software.

Further, the respective functional units included in each of the main body 310 and the operating unit 330 of the image forming apparatus 101 are not limited to being included in the main body 310 or the operating unit 330 with the configuration illustrated in FIG. 5. For example, in the example illustrated in FIG. 5, the authentication unit 516 is included in the operating unit 330, but not being limited thereto, the authentication unit 516 may be configured to be included in the main body 310. In this case, the radio authentication unit 512 notifies the authentication unit 516 of an authentication result of the radio authentication unit 512 (for example, information indicating a user authenticated by the authentication) via the communication path 350. Similarly, the image authentication unit 515 notifies the authentication unit 516 of an authentication result of the image authentication unit 515 (for example, information indicating a user authenticated by the authentication) via the communication path 350. Further, the authentication unit 516 executes, based on the authentication result of the radio authentication unit 512 and the authentication result of the image authentication unit 515 that have been received via the communication path 350, authentication (apparatus authentication) of a user. Further, for example, in the example illustrated in FIG. 5, the human body detecting unit 501 is included in the main body 310, but not being limited thereto, the human body detecting unit 501 may be configured to be included in the operating unit 330.

[Configuration of User Information]

FIG. 6 is a diagram illustrating an example of the user information according to the first embodiment. FIGS. 7A and 7B are diagrams illustrating another example of the user information according to the first embodiment. By reference to FIG. 6 and FIGS. 7A and 7B, a data configuration of the user information-a 520 stored in the storage unit 518 of the operating unit 330 will be described.

The user information-a 520 illustrated in FIG. 6 (an example of first user information, or an example of second user information) is an example of the preregistered user information. In the example in FIG. 6, the user information-a 520 includes information, such as "user number", "name", "e-mail address", "log-in ID", "log-in password", "radio tag ID", and "user feature information".

"User number" is a serial number numbered when information of each user is registered in the user information-a 520, or an identification number or the like specific to each set of data of a user, and is an example of identification information (user identification information) specific to each user. Further, "user number" may be identification information of a user, such as, for example, an employee ID.

"Name" is a name of the user. "E-mail address" is an e-mail address of the user. "Log-in ID" and "log-in password" are an example of authentication information for the user to log into the image forming apparatus 101.

"Radio tag ID" is identification information, such as a tag ID indicating the RFID tag 105 transmitted by the RFID tag 105 carried by each user, and is expressed by, for example, an eight-digit number. "Radio tag ID" is an example of the specific information transmitted from the RFID tag 105, and the specific information may include information other than a number, for example, identification information of the user.

"User feature information" is, for example, feature information related to the face of the user, such as shapes of and relative positions among the respective parts, such as the facial outline, eyes, nose, chin, and cheekbones, of the user of the image forming apparatus 101. The data format of "user feature information" illustrated in FIG. 6 is just an example, and "user feature information" may be in any format. "User feature information" needs to be obtained and registered in the user information-a 520 beforehand for each user.

In the user information-a 520 illustrated in FIG. 6, for example, in a case where the data type is "data 2": the user number is "101002"; the name is "BBBB"; the e-mail address is "bbb@bbb.ccc"; the log-in ID is "BB_BB"; the log-in password is "abcdef"; the radio tag ID is "00535213"; and the user feature information is "{56, 111, −3, . . . , −120, 47, 208}", and the respective pieces of information are stored in association with one another.

In the storage unit 518 of the operating unit 330, for example, about 300 to 1800 sets of the user information-a 520 as illustrated in FIG. 6 may be stored. For example, the user information management unit 517 of the operating unit 330 stores at least a part of the user information-A 506 stored in the storage unit 504 of the main body 310 as the user information-a 520, into the storage unit 518 of the operating unit 330. Thereby, the radio authentication unit 512 and the image authentication unit 515 are able to read the user information-a 520 stored in the storage unit 518 of the operating unit 330 faster than the user information-A 506 stored in the storage unit 504 of the main body 310.

The storage unit 518 may store therein, in addition to or instead of the user information-a 520, user information 801 and 802 illustrated in FIGS. 7A and 7B. In the user information 801 illustrated in FIG. 7A (an example of the first user information), the above described "radio tag ID" and "user ID", which is an example of the identification information specific to each user (user identification information), are stored in association with each other. The radio authentication unit 512 is able to perform authentication (radio authentication) of the RFID tag 105, if at least the information represented by the user information 801 is available. For example, if the radio tag ID of the RFID tag 105 received by the radio communication unit 511 is included in the user information 801, the radio authentication unit 512 authenticates the RFID tag 105 in the authentication, and outputs the user ID corresponding to the RFID tag 105 authenticated by the authentication, to the authentication unit 516 or the like.

In the user information 802 illustrated in FIG. 7B (an example of the second user information), "user ID" and the above described "user feature information" are stored in association with each other. The image authentication unit 515 is able to perform authentication (image authentication) of a user included in an image, if at least the information included in the user information 802 is available. For example, if one set of feature information corresponding to feature information of a facial image of a user extracted by the feature information extracting unit 514 is included in the user information 802, the image authentication unit 515 authenticates, in the authentication, the user included in the image, and outputs the user ID of the user authenticated by the authentication, to the authentication unit 516 or the like.

Further, each of the user information-a 520, and the user information 801 and 802 illustrated in FIG. 6 and FIGS. 7A and 7B is information in a table format, but not being limited thereto, as long as values of the respective fields are able to be managed in association with one another, the information may be in any format.

Flow of Radio Authentication Process

FIG. 8 is a flow chart illustrating an example of a radio authentication process of the image forming apparatus according to the first embodiment. By reference to FIG. 8, a flow of the radio authentication process of the image forming apparatus 101 according to this embodiment will be described. In the description, it will be assumed that the radio communication unit 511 in FIG. 8 is emitting radio waves for receiving specific information from a radio tag.

Step S101

First of all, the radio communication unit 511 receives identification information (the radio tag ID) from the radio tag (RFID tag 105) that is in the predetermined range (for example, the radio detection range 202 illustrated in FIG. 2). If the radio communication unit 511 receives the identification information (Step S101; Yes), the process is advanced to Step S102, and if the radio communication unit 511 is unable to receive the identification information (Step S101; No), the radio communication unit 511 attempts reception again.

Step S102

The radio authentication unit 512 executes authentication of the radio tag (RFID tag 105) that has transmitted the specific information (radio tag ID), based on the identification information received by the radio communication unit 511 and preregistered user information. Specifically, the radio authentication unit 512 executes authentication (radio authentication) of the RFID tag 105, based on the radio tag ID of the RFID tag 105 received by the radio communication unit 511 and the user information-a 520 or the user information-A 506, which has been registered beforehand. The radio authentication unit 512 authenticates the RFID tag 105 in the authentication, if the radio tag ID of the RFID tag 105 received by the radio communication unit 511 is included in the user information-a 520 or the user information-A 506. Further, if the radio tag ID received by the radio communication unit 511 is not included in the user information-a 520 or the user information-A 506, the radio authentication unit 512 does not authenticates the RFID tag 105 in the authentication. The process is then advanced to Step S103.

Step S103

If the RFID tag 105 is authenticated by the authentication as a result of the radio authentication by the radio authentication unit 512 (if the result of the authentication is "OK") (Step S103; Yes), the process is advanced to Step S104. On the contrary, if the RFID tag 105 is not authenticated by the authentication (the result of the authentication is not "OK") (Step S103; No), the process is returned to Step S101, and the same processing is repeated.

Step S104 The radio authentication unit 512 outputs information indicating the user (for example, identification information of the user, such as "user number" or "user ID") of the RFID tag 105 authenticated by the authentication (for which the result of the authentication is "OK") to the authentication unit 516. At this time, the radio authentication unit 512 may output, together with the identification of the user of the RFID tag 105 authenticated by the authentication, information indicating that the authentication has been successful (that the authentication result is "OK") to the authentication unit 516. Further, at Step S103 described above, if the authentication is not successful, the radio authentication unit 512 may output information indicating that the authentication has not been successful (that the authentication result is not "OK") to the authentication unit 516.

The radio authentication process is executed by the image forming apparatus 101 by the above operation of Steps S101 to S104.

Flow of Image Authentication Process

Figure 10A:
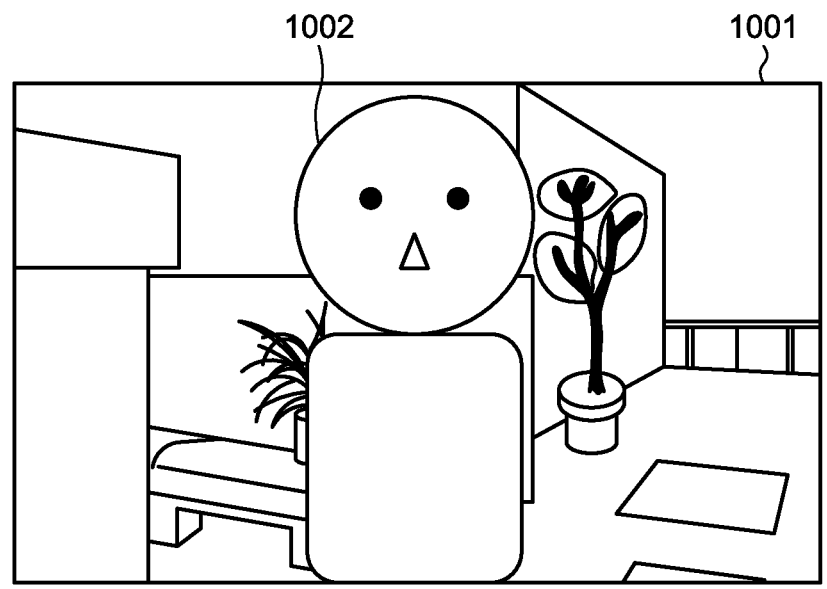
FIGS. 10A and 10B are diagrams illustrating an example of image authentication according to the first embodiment.
Figure 10B:
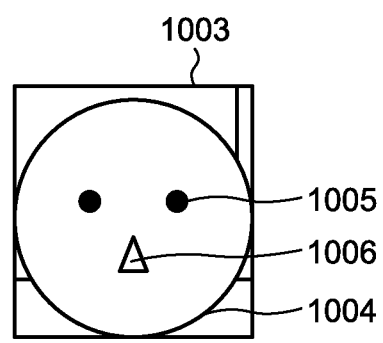

FIG. 9 is a flow chart illustrating an example of an image authentication process of the image forming apparatus according to the first embodiment. FIGS. 10A and 10B are diagrams illustrating an example of image authentication according to the first embodiment. By reference to FIG. 9 and FIGS. 10A and 10B, a flow of the image authentication process of the image forming apparatus 101 according to this embodiment will be described.

Step S201

The imaging unit 513 captures an image towards an imaging range (for example, the image authentication range 203 illustrated in FIG. 2) in front thereof to acquire a captured image. An example of the acquired captured image is illustrated in FIG. 10A. A captured image 1001 illustrated in FIG. 10A includes a user 1002 who is in front of the image forming apparatus 101. Accordingly, the camera 340 is installed such that the user 1002 in front of the image forming apparatus 101 is included in the captured image 1001. The process is then advanced to Step S202.

Step S202

The feature information extracting unit 514 detects an image (facial image) of a face portion from the captured image acquired by the imaging unit 513. An example of the detected facial image is illustrated in FIG. 10B. The feature information extracting unit 514 extracts, for example, parts, such as an outline 1004, eyes 1005, and a nose 1006, of the face of the user from the captured image 1001 imaged by the camera 340, and detects a facial image 1003 of the user using, for example, a known pattern matching technique. The process is then advanced to Step S203.

Step S203

If the facial image 1003 is detected from the captured image 1001 by the feature information extracting unit 514 (Step S203; Yes), the process is advanced to Step S204. On the contrary, if the facial image 1003 is not detected from the captured image 1001 by the feature information extracting unit 514 (Step S203; No), the process is returned to Step S201, and the same processing is repeated.

Step S204

The image authentication unit 515 executes authentication (image authentication) using the facial image detected. Any of various known face authentication techniques (for example, see the above mentioned publication of Japanese Unexamined Patent Application Publication No. 2015-35178) is applicable to the process of the image authentication. Herein, only an outline of one example will be described.

For example, "user feature information" of the user information-a 520 and user information-A 506 includes information on shapes of and relative positions among the respective parts, such as the facial outline, eyes, nose, chin, and cheekbones, the information having been obtained beforehand for each user authorized to use the image forming apparatus 101. Further, the feature information extracting unit 514 detects the facial image 1003 included in the captured image 1001 acquired by the imaging unit 513 and extracts feature information of the user from the detected facial image 1003. The image authentication unit 515 compares the feature information of the user extracted by the feature information extracting unit 514, with each set of "user feature information" of the user information-a 520 or user information-A 506, and determines whether or not the user included in the captured image 1001 is a user that has been registered in the user information-a 520 or user information-A 506. If it is determined that the user included in the captured image 1001 is a user that has been registered in the user information-a 520 or user information-A 506, the image authentication unit 515 authenticates the user included in the captured image 1001 in the authentication. On the contrary, if it is determined that the user included in the captured image 1001 is not a user that has been registered in the user information-a 520 or user information-A 506, the image authentication unit 515 does not authenticates the user included in the captured image 1001 in the authentication. The process is then advanced to Step S205.

Step S205

If, as a result of the image authentication by the image authentication unit 515, the user is authenticated by the authentication (the authentication result is "OK") (Step S205; Yes), the process is advanced to Step S206. On the contrary, if the user is not authenticated by the authentication (the authentication result is not "OK") (Step S205; No), the process is returned to Step S201, and the same processing is repeated.

Step S206

The image authentication unit 515 outputs information indicating the user (for example, identification information of the user, such as "user number" or "user ID") of the user authenticated by the authentication (for which the authentication result is "OK") to the authentication unit 516. At this time, the image authentication unit 515 may output, together with the identification information of the user authenticated by the authentication, information indicating that the authentication has been successful (that the authentication result is "OK") to the authentication unit 516. Further, at Step S205 described above, if the authentication is not successful, the image authentication unit 515 may output information indicating that the authentication has not been successful (that the authentication result is not "OK") to the authentication unit 516.

The image authentication process is executed by the image forming apparatus 101 by the above operation of Steps S201 to S206.

Authentication Process of Image Forming Apparatus

Figure 12:
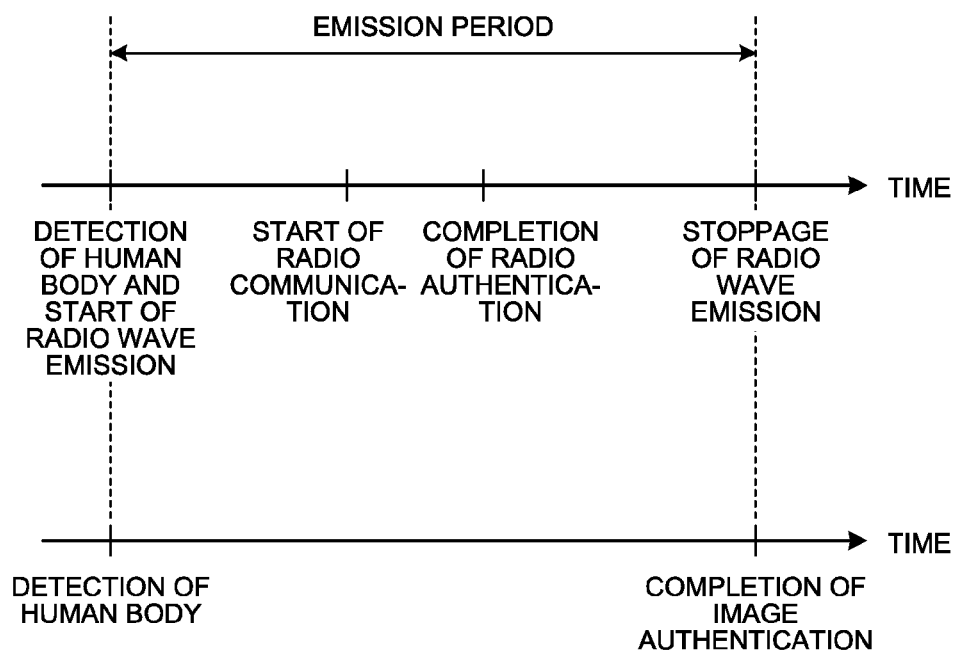
FIG. 12 is a diagram illustrating timings to start and stop emission of radio waves for radio authentication in the image forming apparatus according to the first embodiment.

FIG. 11 is a flow chart illustrating an example of an authentication process of the image forming apparatus according to the first embodiment. FIG. 12 is a diagram illustrating timings to start and stop emission of radio waves for radio authentication in the image forming apparatus according to the first embodiment. By reference to FIG. 11 and FIG. 12, a flow of the authentication process of the image forming apparatus 101 according to this embodiment will be described. It will be assumed that at a starting time point of the authentication process illustrated in FIG. 11, the image forming apparatus 101 has been controlled in the above described power saving state by the power state control unit 502.

Step S401

If a person is detected in the detection range (for example, the sensor detection range 201 illustrated in FIG. 2) around the image forming apparatus 101 by the human body detecting unit 501 of the main body 310 (Step S401; Yes), the process is advanced to Step S402. If the human body detecting unit 501 detects a person, the human body detecting unit 501 notifies the power state control unit 502 of that detection information, and further, notifies, via the communication path 350, the radio communication unit 511 of the detection information. If a person is not detected (Step S401; No), the human body detecting unit 501 continues the operation for detecting a person.

Step S402

The power state control unit 502 of the main body 310 cancels the power saving states of the main body 310 and the operating unit 330. For example, for the operating unit 330, the power state control unit 502 notifies the operating unit 330 of a restoration instruction, via the communication path 350, to restore the operating unit 330 from the power saving state to the normal state. Thereby, the radio authentication process of the radio authentication unit 512 illustrated in FIG. 8 and the image authentication process by the image authentication unit 515 illustrated in FIG. 9 become executable. The process is then advanced to Step S403.

Step S403

The radio communication unit 511 of the operating unit 330 starts emitting radio waves in order to receive specific information from a radio tag (RFID tag 105) if the operating unit 330 is restored to the normal state by the power state control unit 502 and the detection information indicating that a person has been detected is received from the human body detecting unit 501. A timing of the detection of a person by the human body detecting unit 501 and start of the emission of radio waves by the radio communication unit 511 is indicated by "detection of human body and start of radio wave emission" in FIG. 12. The process is then advanced to Steps S404 and S405.

Step S404

The radio communication unit 511 and the radio authentication unit 512 of the operating unit 330 execute, for example, the radio authentication process illustrated in FIG. 8. When the user 106 having the RFID tag 105 enters the radio detection range 202 after entering the sensor detection range 201 illustrated in FIG. 2 and being detected by the human body detecting unit 501, radio communication between the radio communication unit 511 and the RFID tag 105 is enabled by the radio waves emitted by the radio communication unit 511. A timing of start of this radio communication is indicated by "start of radio communication" in FIG. 12.

If the RFID tag 105 is authenticated by the authentication by the radio authentication process, the radio authentication unit 512 outputs information indicating that the processing result of the radio authentication process is "OK" and identification information of the user of the RFID tag 105 authenticated by the authentication (for example, "user number" illustrated in FIG. 6), to the authentication unit 516. On the contrary, if the RFID tag 105 is not authenticated by the authentication by the radio authentication process, the radio authentication unit 512 outputs information indicating that the processing result of the radio authentication process is not "OK", to the authentication unit 516. A timing of completion of the radio authentication process by the radio authentication unit 512 is indicated by "completion of radio authentication" in FIG. 12. The process is then advanced to Step S406.

Step S405

The imaging unit 513, the feature information extracting unit 514, and the image authentication unit 515, of the operating unit 330 execute, for example, the image authentication process illustrated in FIG. 9. If a user included in a captured image is authenticated by authentication by the image authentication process, the image authentication unit 515 outputs information indicating that the processing result of the image authentication process is "OK", and identification information of the user authenticated by the authentication (for example, "user number" illustrated in FIG. 6), to the authentication unit 516. On the contrary, if the user included in the captured image is not authenticated by the authentication by the image authentication process, the image authentication unit 515 outputs information indicating that the processing result of the image authentication process is not "OK", to the authentication unit 516. A timing of completion of the image authentication process by the image authentication unit 515 is indicated by "completion of image authentication" in FIG. 12. The process is then advanced to Step S406.

Step S406

Based on the information output from the radio authentication unit 512 and the image authentication unit 515, the authentication unit 516 determines whether or not the result of the radio authentication process is "OK" (successful) and the result of the image authentication process is "OK" (successful). If both of the result of the radio authentication process and the result of the image authentication process are "OK" (successful) (Step S406; Yes), the process is advanced to Step S407. On the contrary, if any of the result of the radio authentication process and the result of the image authentication process is not "OK" (successful) (Step S406; No), the process is advanced to Step S410.

Step S407

The authentication unit 516 determines whether or not the user of the RFID tag 105, for which the radio authentication process has been "OK" in Step S404, is the same as the user, for which the image authentication process has been "OK" in Step S405. For example, the authentication unit 516 determines whether or not the identification information of the user output from the radio authentication unit 512 matches the identification information of the user output from the image authentication unit 515. If the identification information of the user output from the radio authentication unit 512 matches the identification information of the user output from the image authentication unit 515 (Step S407; Yes), the process is advanced to Steps S408 and S409. On the contrary, if the identification information of the user output from the radio authentication unit 512 does not match the identification information of the user output from the image authentication unit 515 (Step S407; No), the process is advanced to Step S410.

Step S408

If it is determined that the identification information of the user output from the radio authentication unit 512 matches the identification information of the user output from the image authentication unit 515, the authentication unit 516 authorizes the user to log into the image forming apparatus 101. Thereby, the user becomes able to use the image forming apparatus 101.

Step S409

If apparatus authentication by the authentication unit 516 is successful (the identification information of the user output from the radio authentication unit 512 matches the identification information of the user output from the image authentication unit 515), the radio communication unit 511 stops the emission of radio waves. A timing of the stoppage of the emission of radio waves by the radio communication unit 511 is indicated by "stoppage of radio wave emission" in FIG. 12. Since the radio authentication process normally finishes earlier than the image authentication process, in FIG. 12, the apparatus authentication is illustrated as resulting in success when the image authentication process is finished. Further, FIG. 12 illustrates an example of the case where the radio authentication and image authentication result in success and the apparatus authentication also results in success, but in this case, as illustrated in FIG. 12, the emission period of radio waves by the radio communication unit 511 is a period between a time point, at which the person is detected by the human body detecting unit 501, and a time point, at which the emission of radio waves is stopped by the radio communication unit 511 in association with the success in the apparatus authentication by the authentication unit 516.

Step S410

The power state control unit 502 determines whether or not a predetermined time period (for example, five minutes) has elapsed since the cancelling of the power saving states of the main body 310 and the operating unit 330 in Step S402 (that is, since the detection of the person by the human body detecting unit 501). Further, the operating unit 330 determines whether or not there has been operation input from a user (user 106) in the above mentioned predetermined time period. If the predetermined time period has elapsed without any operation input from a user (Step S410; Yes) the process is advanced to Step S411. On the contrary, if there has been operation input from a user, or if the predetermined time period has not elapsed (Step S410; No), the process is returned to Steps S404 and S405, and the same processing is repeated.

Step S411

The radio communication unit 511 stops the emission of radio waves. The process is then advanced to Step S412.

Step S412

The power state control unit 502 causes the main body 310 and the operating unit 330 to shift to the power saving state. For example, for the operating unit 330, the power state control unit 502 notifies the operating unit 330 of a shift instruction, via the communication path 350, to cause the operating unit 330 to shift from the normal state to the power saving state.

The authentication process is executed by the image forming apparatus 101 by the above operation of Steps S401 to S412.

As described above, in the image forming apparatus 101 according to this embodiment, in the radio authentication, the radio communication unit 511 starts emitting radio waves in order to receive specific information from a radio tag (RFID tag 105) when a person is detected by the human body detecting unit 501, and stops emitting radio waves when apparatus authentication by the authentication unit 516 results in success. That is, the emission of radio waves is started at a timing when the user 106 having a radio tag approaches the image forming apparatus 101, that is, at a timing when information on the radio tag needs to be read, and the emission of radio waves is stopped at a timing when the apparatus authentication results in success and the emission of radio waves becomes unnecessary. Thereby, electric power consumption resulting from the emission of radio waves by the RFID tag reader 103 included in the radio communication unit 511 is able to be reduced. In this case, as compared to, for example, a case, where a state, in which information from the radio tag is readable, is maintained by emission of radio waves at all times from the RFID tag reader 103, the effect of reduction in the electric power consumption of the RFID tag reader 103 is large.

Further, when all of the authentication functions are functioning normally, the image forming apparatus 101 authorizes the image forming apparatus 101 to be used if the user authenticated by the radio authentication is the same as the user authenticated by the image authentication. Thereby, the image forming apparatus 101 enables accuracy of authentication to be easily improved in an authentication method using a captured image, such as image authentication.

Further, if the predetermined time period has elapsed since the cancelling of the power saving states of the main body 310 and the operating unit 330 and there has not been any operation input on the operating unit 330 from a user; assuming that the image forming apparatus 101 is not used by any user, the radio communication unit 511 stops the emission of radio waves and the power state control unit 502 causes the main body 310 and the operating unit 330 to shift to their power saving states again. Thereby, wasteful consumption of electric power is able to be reduced.

Second Embodiment

Hereinafter, by reference to FIG. 13A to FIG. 16, an image forming apparatus according to a second embodiment will be described, with points different from the image forming apparatus 101 according to the first embodiment being focused. In this embodiment, operation for optimizing or increasing suitability of the timing of the emission of radio waves for receiving specific information from a radio tag will be described. A configuration of an information processing system and a hardware configuration and a software configuration of the image forming apparatus, according to this embodiment, are respectively the same as the configuration of the information processing system 100 and the hardware configuration and the software configuration of the image forming apparatus 101 described with respect to the first embodiment. Further, a radio authentication process and an image authentication process of the image forming apparatus according to this embodiment are respectively the same as the radio authentication process and the image authentication process of the image forming apparatus 101 described with respect to the first embodiment.

Outline of Operation for Shortening Emission Period

Figure 13A:
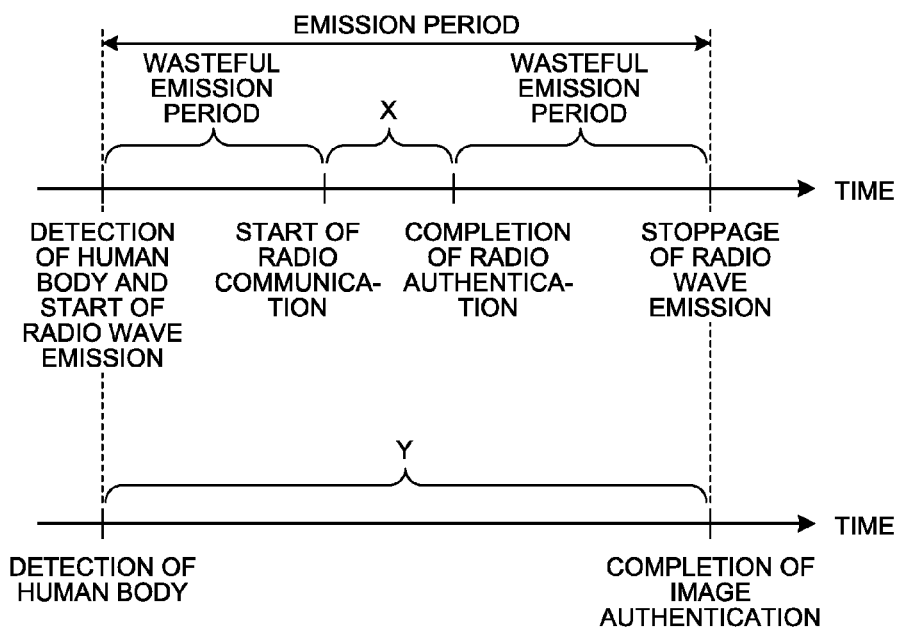
FIGS. 13A and 13B are diagrams illustrating operation for shortening an emission period of radio waves for radio authentication in an image forming apparatus according to a second embodiment.
Figure 13B:
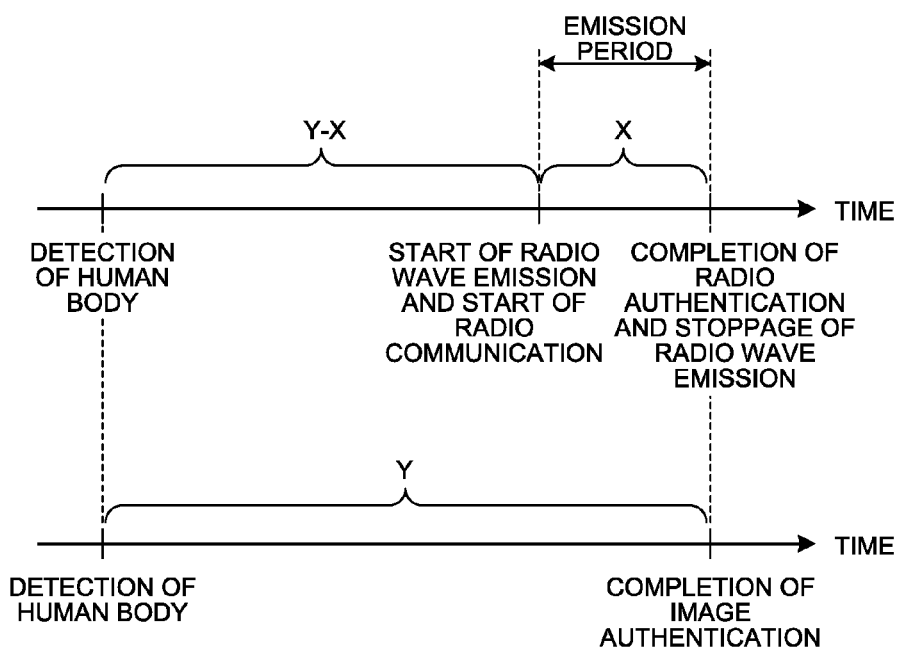

FIGS. 13A and 13B are diagrams illustrating operation for shortening an emission period of radio waves for radio authentication in the image forming apparatus according to the second embodiment. FIG. 14 is a diagram illustrating an example of time information according to the second embodiment. By reference to FIGS. 13A and 13B, and FIG. 14, an outline of timings to start and stop emission of radio waves emitted by the radio communication unit 511 for the radio authentication in this embodiment will be described. In order to make the description concise, in FIGS. 13A and 13B, a case where the radio authentication and image authentication are performed for a single user will be described.

Generally, in a radio authentication process, only identification information (radio tag ID) needs to be subjected to collation, and as compared to an image authentication process of comparing feature information of faces, the radio authentication process has a short processing time. However, although the radio authentication process is completed earlier than the image authentication process, in order to execute apparatus authentication, the radio authentication process just needs to be completed before the image authentication process is completed.

FIG. 13A illustrates timings of: detection of a human body; start and stoppage of radio wave emission; start of radio communication; completion of radio authentication; and completion of image authentication. The respective timings illustrated in FIG. 13A are the same as the timings illustrated in FIG. 12 of the first embodiment. As illustrated in FIG. 2, the sensor detection range 201 is generally larger than the radio detection range 202, and thus as illustrated in FIG. 13A, there is a time lag from the detection of a human body to the start of radio communication with the RFID tag 105, and the emission of radio waves in this period is emission not contributing to radio communication and results in wasteful electric power consumption by the RFID tag reader 103. Further, as illustrated in FIG. 13A, even if radio authentication has been completed (successful), since there is also a time lag from the completion of the radio authentication to ending of image authentication and authorization in apparatus authentication, the emission of radio waves in this period is also emission not contributing to radio communication and results in wasteful electric power consumption by the RFID tag reader 103. For example, electric power consumption by the radio wave emission of the RFID tag reader 103 is equal to or greater than 7 [W]. Therefore, the timings to start and stop the emission of radio waves are desirably adjusted so that such unnecessary radio wave emission by the RFID tag reader 103 is not carried out.

Thus, as described above, the radio authentication process is completed earlier than the image authentication process: but since, in order to execute the apparatus authentication, the radio authentication process just needs to be finished before the image authentication process is completed; in this embodiment, in order to shorten the wasteful emission period, as described below, the timings to start and stop the emission of radio waves are adjusted.

In order to do so, like in time information 900 illustrated in FIG. 14, each time of detection of a human body, start of radio communication, completion of radio authentication, and completion of image authentication is stored. A storage destination of the time information 900 may be, for example, the storage unit 504 of a main body 310a described later and illustrated in FIG. 15, or the storage unit 518 of an operating unit 330a. Before the timings of start and stoppage of radio wave emission are adjusted, it is firstly determined whether or not a timing of completion of (success in) the radio authentication process is earlier than a timing of completion of (success in) the image authentication process. If the timing of the completion of (success in) the radio authentication process is earlier, information stored in the time information 900 is referred to, and an average period of periods from start times of radio communication and completion times of radio communication is calculated as a period X (first period) illustrated in FIG. 13A. For example, in the example illustrated in FIG. 14, for time information of a first line of the time information 900, a period between a start time of radio communication, "13:13:02.150", and a completion time of radio authentication, "13:13:02.200", is 50 [ms]. Further, for time information of a second line of the time information 900, a period between a start time of radio communication, "13:13:17.252", and a completion time of radio communication, "13:13:17.300", is 48 [ms]. When an average of these periods is calculated, the period X=49 [ms] is found.

Further, by reference to the information stored in the time information 900, the shortest period so far of periods between times, at which human bodies were detected (hereinafter, referred to as "times of human body detection") (detection times), and completion times of image authentication is found as a period Y (second period) as illustrated in FIG. 13A. For example, in the example illustrated in FIG. 14, the shortest period Y of periods between times of human body detection and completion times of image authentication is found from the time information of the second line, and specifically, is 2.7 [s] between a time of human body detection, "13:13:15.200", and a completion time of image authentication, "13:13:17.900". The period Y is not limited to the shortest period of the periods between the times of human detection and the completion times of image authentication, and may be, for example, a period between a time of human body detection and a completion time of image authentication, the period being calculated by use of the latest information of the time information stored in the time information 900.

As illustrated in FIG. 13B, after a time period found by (Y−X) has elapsed since the detection of a human body (user), the RFID tag reader 103 starts emitting radio waves. For example, in the example illustrated in FIG. 14, Y−X= 2.7 [s]−0.049 [s]=2.651 [s], and thus after 2.651 [s] from the detection of a human body, the emission of radio waves is started. Thereby, as illustrated in FIG. 13B, radio communication with the RFID tag 105 becomes possible when the emission of radio waves is started, and thus a wasteful radio wave emission period before the start of radio communication illustrated in FIG. 13A is able to be eliminated. Further, as illustrated in FIG. 13B, the timing of the completion of radio authentication and the timing of the completion of image authentication are able to be made substantially the same, and a wasteful radio wave emission period after the completion of radio authentication illustrated in FIG. 13A is able to be eliminated. That is, as illustrated in FIG. 13B, the period from the time of start of radio communication to the time of completion of radio authentication, the period being represented by the period X, is substantially the emission period of radio waves. Thereby, as compared to the case of FIG. 13A, that is, the case of the first embodiment, the emission period of radio waves by the RFID tag reader 103 is able to be shortened and electric power consumption resulting from the emission of radio waves is able to be reduced.

Functional Configuration

Figure 15:
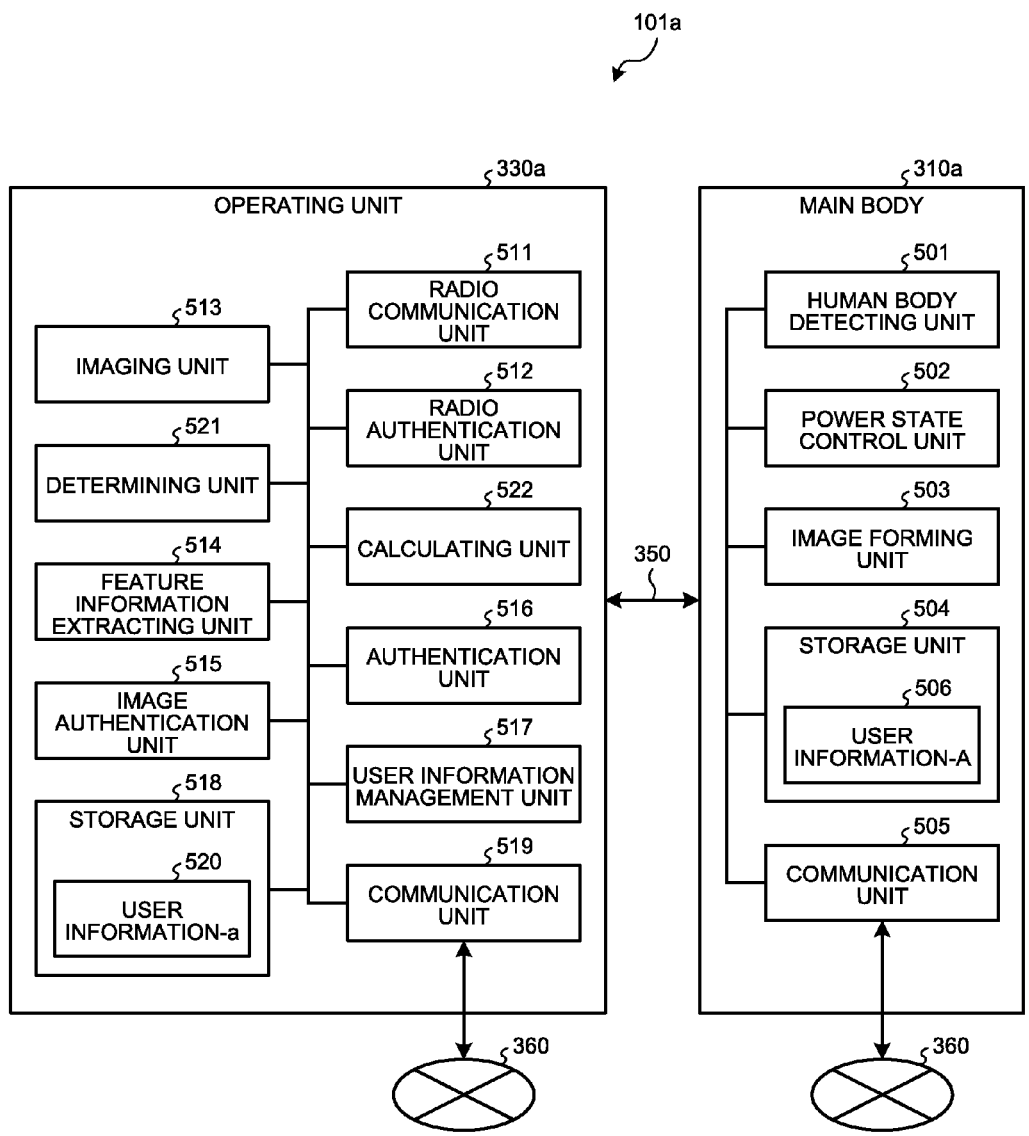
FIG. 15 is a diagram illustrating an example of a functional configuration of the image forming apparatus according to the second embodiment.

FIG. 15 is a diagram illustrating an example of a functional configuration of the image forming apparatus according to the second embodiment. By reference to FIG. 15, a functional configuration of an image forming apparatus 101a according to this embodiment will be described.

As illustrated in FIG. 15, a configuration of the main body 310a of the image forming apparatus 101a is the same as the configuration of the main body 310 according to the first embodiment illustrated in FIG. 5.

As illustrated in FIG. 15, the operating unit 330a of the image forming apparatus 101a has, in addition to the configuration of the operating unit 330 according to the first embodiment illustrated in FIG. 5, a determining unit 521 (first determining unit) and a calculating unit 522 (calculating unit). The rest of the configuration of the operating unit 330a is the same as the configuration of the operating unit 330 according to the first embodiment illustrated in FIG. 5.

The determining unit 521 is a functional unit that determines, before the timings of start and stoppage of radio wave emission by the radio communication unit 511 (including the RFID tag reader 103) are adjusted, as described above, whether or not the timing of completion of (success in) the radio authentication process is earlier than the timing of completion of (success in) the image authentication process. For example, by reference to the time information 900 illustrated in FIG. 14 and comparison between the completion time of radio communication and the completion time of image authentication, of time information of the same line, the determination is possible. The radio authentication unit 512 is realized by, for example, a program operated by the CPU 331 illustrated in FIG. 3.

The calculating unit 522 is a functional unit that refers to the time information 900 to calculate the above described period X and period Y.

The radio communication unit 511, the radio authentication unit 512, the imaging unit 513, the feature information extracting unit 514, the image authentication unit 515, the authentication unit 516, the user information management unit 517, the storage unit 518, the communication unit 519, the determining unit 521, and the calculating unit 522, of the operating unit 330a illustrated in FIG. 15 represent their functions conceptually, and are not limited to such a configuration. For example, more than one of the functional units illustrated as independent functional units in the operating unit 330a illustrated in FIG. 15 may be configured as a single functional unit. On the contrary, the function that one of the functional units in the operating unit 330a illustrated in FIG. 15 has may be divided into plural functions, and may be configured as plural functional units.

Further, a part or all of the radio communication unit 511, the radio authentication unit 512, the imaging unit 513, the feature information extracting unit 514, the image authentication unit 515, the authentication unit 516, the user information management unit 517, the determining unit 521, and the calculating unit 522, of the operating unit 330a may be realized by a hardware circuit, such as an FPGA or ASIC, instead of a program, which is software.

Authentication Process of Image Forming Apparatus

Figure 16:
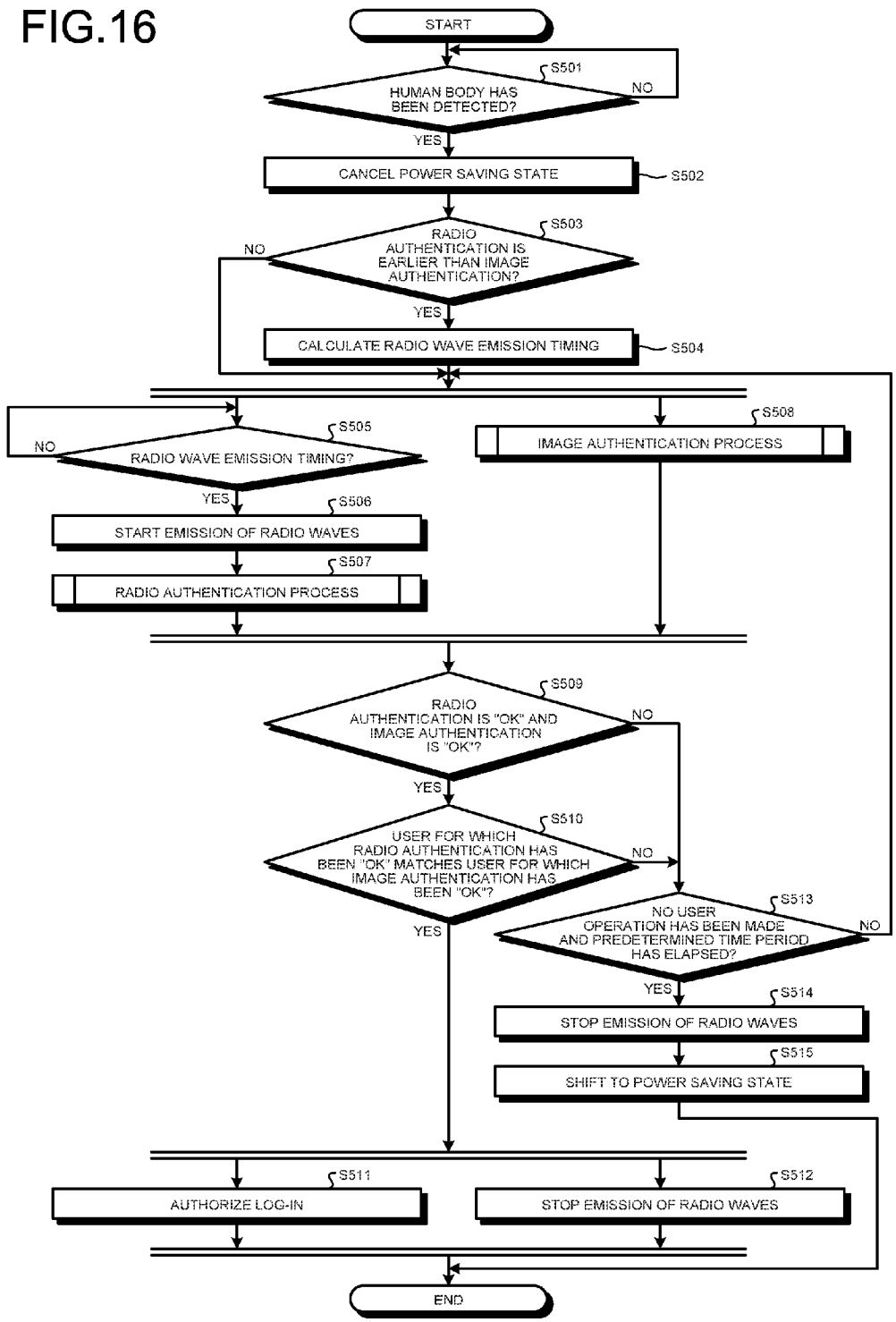
FIG. 16 is a flow chart illustrating an example of an authentication process of the image forming apparatus according to the second embodiment.

FIG. 16 is a flow chart illustrating an example of an authentication process of the image forming apparatus according to the second embodiment. By reference to FIG. 16, a flow of an authentication process of the image forming apparatus 101a according to this embodiment will be described. Like in the time information 900 illustrated in FIG. 14, the human body detecting unit 501 stores times of human body detection, the radio communication unit 511 stores times of start of radio communication with the RFID tag 105, the radio authentication unit 512 stores times of completion of (success in) radio authentication, and the image authentication unit 515 stores times of completion of (success in) image authentication.

Steps S501 and S502

Processing of Steps S501 and S502 is respectively the same as the processing of Steps S401 and S402 of the first embodiment illustrated in FIG. 11. The process is then advanced to Step S503.

Step S503

The determining unit 521 of the operating unit 330a refers to the time information 900 illustrated in FIG. 14, and determines whether or not the timing of completion of (success in) the radio authentication process is earlier than the timing of completion of (success in) the image authentication process. For example, the determination may be made based on the latest time information indicated by the time information 900, or the determination may be made based on an average of a predetermined number of the latest pieces of information (a predetermined number of lines in the time information 900). If the timing of completion of (success in) the radio authentication process is earlier than the timing of completion of (success in) the image authentication process (Step S503; Yes), the process if advanced to Step S504, and if the timing of completion of the radio authentication process is not earlier than the timing of completion of the image authentication process (Step S503; No), the process is advanced to Steps S505 and S508.

Step S504

The calculating unit 522 of the operating unit 330a refers to the time information 900, calculates the period X and period Y, and calculates a period found by (Y−X). That is, the calculating unit 522 calculates a timing of emission of radio waves by the radio communication unit 511. The process is then advanced to Steps S505 and S508.

Step S505

The radio communication unit 511 of the operating unit 330a determines whether or not the period calculated by the calculating unit 522 and found by (Y−X) has elapsed since the detection of a person by the human body detecting unit 501. If the period found by (Y−X) has elapsed (Step S505; Yes), the process is advanced to Step S506, and if the period has not elapsed (Step S505; No), the radio communication unit 511 continues to determine whether or not the period has elapsed. However, in the above described Step S503, if the determining unit 521 determines that the timing of completion of (success in) the radio authentication process is not earlier than the timing of completion of (success in) the image authentication process, this Step S505 is skipped.

Step S506

The radio communication unit 511 starts emitting radio waves in order to receive specific information from a radio tag (RFID tag 105), if the period calculated by the calculating unit 522 and found by (Y−X) has elapsed since the detection of a person by the human body detecting unit 501 as illustrated in FIG. 13B. However, if, in Step S503 described above, the determining unit 521 determines that the timing of completion of (success in) the radio authentication process is not earlier than the timing of completion of (success in) the image authentication process, the radio communication unit 511 starts emission of radio waves at the normal timing, that is, when detection information indicating that a person has been detected is received from the human body detecting unit 501, similarly to the first embodiment. The process is then advanced to Step S507.

Step S507

The radio communication unit 511 and the radio authentication unit 512 of the operating unit 330a execute, for example, the radio authentication process illustrated in FIG. 8. At a time point, at which the period calculated by the calculating unit 522 and found by (Y−X) has elapsed since the detection of a person by the human body detecting unit 501, the user 106 having the RFID tag 105 is supposed to be in the radio detection range 202 already, and thus, the radio communication unit 511 is in a state of being able to perform radio communication with the RFID tag 105, and the radio authentication unit 512 is able to start the radio authentication process from a time point, at which emission of radio waves is started.

When the RFID tag 105 is authenticated by the authentication by the radio authentication process, the radio authentication unit 512 outputs information indicating that the processing result of the radio authentication process is "OK" and identification information of the user of the RFID tag 105 authenticated by the authentication (for example, "user number" illustrated in FIG. 6), to the authentication unit 516. On the contrary, if the RFID tag 105 is not authenticated by the authentication by the radio authentication process, the radio authentication unit 512 outputs information indicating that the processing result of the radio authentication process is not "OK", to the authentication unit 516. The process is then advanced to Step S509.

Step S508

The imaging unit 513, the feature information extracting unit 514, and the image authentication unit 515, of the operating unit 330a execute, for example, the image authentication process illustrated in FIG. 9. As described above, as a result of the calculating unit 522 calculating the period found by (Y−X) and the timing of emission of radio waves by the radio communication unit 511 being adjusted in Step S504, the timing of completion of radio authentication by the radio authentication unit 512 and the timing of completion of image authentication by the image authentication unit 515 become substantially the same.

If a user included in a captured image is authenticated by the authentication by the image authentication process, the image authentication unit 515 outputs information indicating that the processing result of the image authentication process is "OK", and identification information of the user authenticated by the authentication (for example, "user number" illustrated in FIG. 6), to the authentication unit 516. On the contrary, if the user included in the captured image is not authenticated by the authentication by the image authentication process, the image authentication unit 515 outputs information indicating that the processing result of the image authentication process is not "OK", to the authentication unit 516. The process is then advanced to Step S509.

Steps S509 to S515

Processing of Steps S509 to S515 is respectively the same as the processing of Steps S406 to S412 of the first embodiment illustrated in FIG. 11. As described above, since the timing of completion of radio authentication by the radio authentication unit 512 and the timing of completion of image authentication by the image authentication unit 515 become substantially the same, the timing of stoppage of radio wave emission by the radio communication unit 511 in Step S512 is able to be made substantially the same as the timing of completion of apparatus authentication by the authentication unit 516.

The authentication process is executed by the image forming apparatus 101a by the above operation of Steps S501 to S515.

As described above, the calculating unit 522 calculates the period X, which is an average period of periods between start times of radio communication and completion times of radio authentication, and the period Y between a time of human body detection and a completion time of image authentication, and if the period found by (Y−X) has elapsed since detection of a person by the human body detecting unit 501, the radio communication unit 511 starts emitting radio waves in order to receive specific information from the radio tag (RFID tag 105). Thereby, as illustrated in FIG. 13B, since radio communication with the RFID tag 105 becomes possible from the timing of start of the emission of radio waves, the wasteful radio wave emission period before the start of the radio communication illustrated in FIG. 13A is able to be eliminated; and since the timing of completion of radio authentication and the timing of completion of image authentication are able to be made substantially the same, the wasteful radio wave emission period after the completion of the radio communication illustrated in FIG. 13A is able to be eliminated. Therefore, as compared to the case of the first embodiment, the emission period of radio waves by the RFID tag reader 103 is able to be shortened and electric power consumption resulting from the emission of radio waves is able to be reduced.

Third Embodiment

Hereinafter, by reference to FIG. 17 and FIG. 18, an image forming apparatus according to a third embodiment will be described, with points different from the image forming apparatus 101 according to the first embodiment being focused. Radio authentication processes are usually often completed comparatively early as compared to image authentication processes. In this embodiment, operation of stopping emission of radio waves for radio authentication from a time point of completion of a radio authentication process, if the radio authentication process is completed before an image authentication process is completed, will be described. A configuration of an information processing system and a hardware configuration and a software configuration of the image forming apparatus, according to this embodiment are respectively the same as the configuration of the information processing system 100 and the hardware configuration and the software configuration of the image forming apparatus 101 described with respect to the first embodiment. Further, a radio authentication process and an image authentication process of the image forming apparatus according to this embodiment are respectively the same as the radio authentication process and the image authentication process of the image forming apparatus 101 described with respect to the first embodiment.

Outline of Operation for Shortening Emission Period

By reference to FIGS. 13A and 13B described above, an outline of timings of start and stoppage of emission of radio waves emitted by the radio communication unit 511 for the radio authentication in this embodiment will be described. In order to make the description concise, a case where the radio authentication and image authentication are performed for a single user will be described.

As described above, generally, in a radio authentication process, only identification information (radio tag ID) needs to be subjected to collation, and as compared to an image authentication process of comparing feature information of faces, the radio authentication process has a short processing time. FIG. 13A described above illustrates timings of: detection of a human body; start and stoppage of radio wave emission, start of radio communication, completion of radio authentication, and completion of image authentication. As illustrated in FIG. 2, the sensor detection range 201 is generally larger than the radio detection range 202, and thus as illustrated in FIG. 13A, there is a time lag from the detection of a human body to the start of radio communication with the RFID tag 105, and the emission of radio waves in this period is emission not contributing to radio communication and results in wasteful electric power consumption by the RFID tag reader 103. Further, as illustrated in FIG. 13A, even if radio authentication has been completed, since there is also a time lag from the completion of radio authentication to the completion of image authentication and authorization in apparatus authentication, the emission of radio waves in this period is also emission not contributing to radio communication and results in wasteful electric power consumption by the RFID tag reader 103. Therefore, the timings of start and stoppage of emission of radio waves are desirably adjusted so that such unnecessary radio wave emission by the RFID tag reader 103 is not carried out, and in the above described second embodiment, like with the time information 900 illustrated in FIG. 14, by times of the respective timings being managed and a start timing of emission of radio waves being calculated, the periods of wasteful radio wave emission before and after the radio authentication process are eliminated.

However, in the second embodiment, in order to eliminate the periods of wasteful radio wave emission before and after the radio authentication process, the processing load for the management of the times with the time information 900 and the calculation of the start timing of emission of radio waves is required. Thus, in this embodiment, if the radio authentication process is completed during execution of the image authentication process, since emission of radio waves after the completion is wasteful, although emission of radio waves before the radio authentication process is not prevented, by stoppage of emission of radio waves after the radio authentication process, wasteful electric power consumption is reduced. Thereby also, as compared to a case, for example, where a state, in which information from the radio tag is readable, is maintained by emission of radio waves at all times from the RFID tag reader 103, the effect of reduction in the electric power consumption of the RFID tag reader 103 becomes sufficiently large.

Functional Configuration

Figure 17:
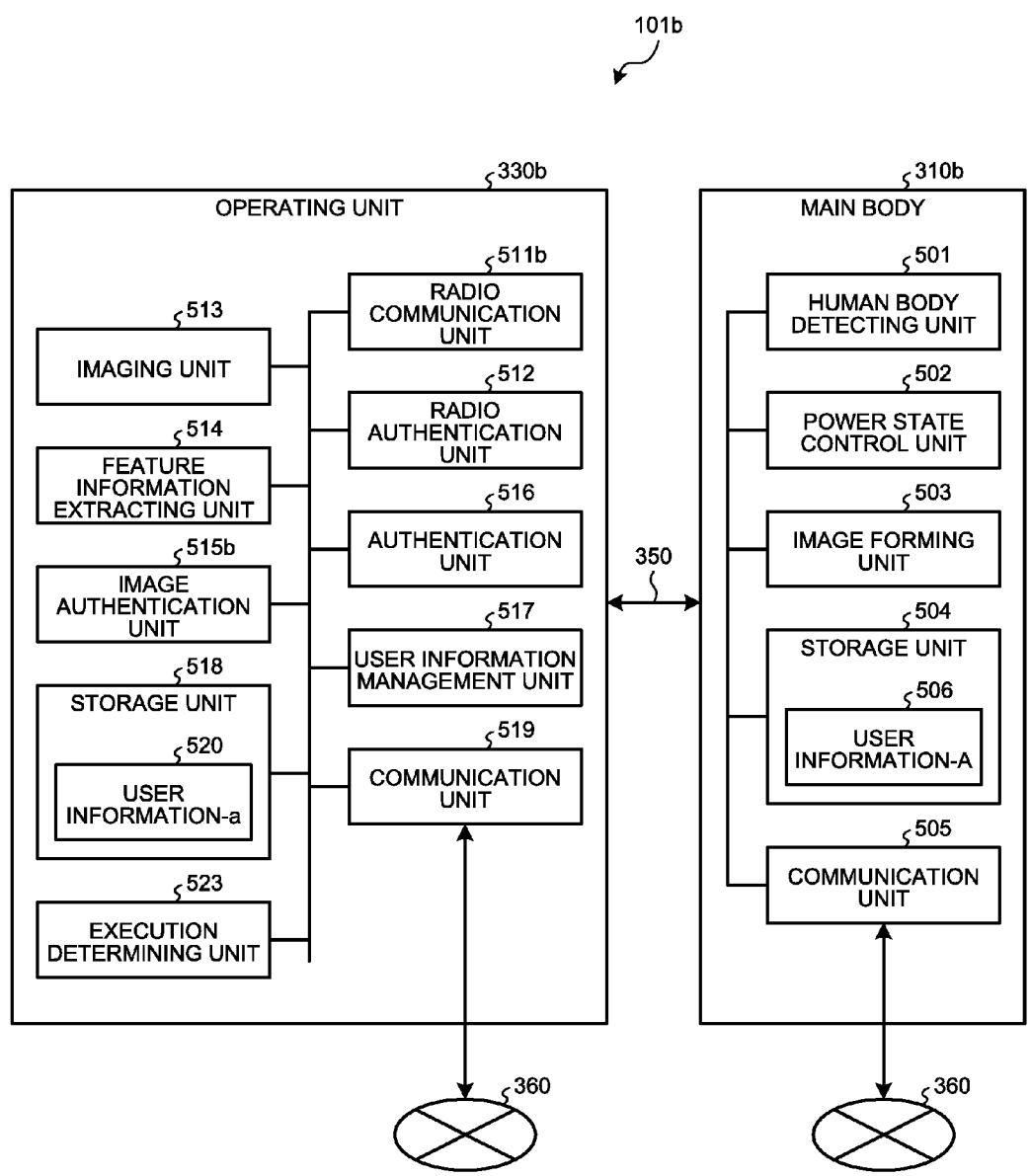
FIG. 17 is a diagram illustrating an example of a functional configuration of an image forming apparatus according to a third embodiment.

FIG. 17 is a diagram illustrating an example of a functional configuration of the image forming apparatus according to the third embodiment. By reference to FIG. 17, a functional configuration of an image forming apparatus 101b according to this embodiment will be described.

As illustrated in FIG. 17, a configuration of a main body 310b of the image forming apparatus 101b is the same as the configuration of the main body 310 according to the first embodiment illustrated in FIG. 5.

As illustrated in FIG. 17, the operating unit 330a of the image forming apparatus 101b has a radio communication unit 511b (radio communication unit), the radio authentication unit 512 (first authentication unit), the imaging unit 513 (imaging unit), the feature information extracting unit 514, a image authentication unit 515b (second authentication unit), the authentication unit 516 (apparatus authentication unit), the user information management unit 517, the storage unit 518, the communication unit 519, and an execution determining unit 523 (second determining unit). Functions of the radio authentication unit 512, the imaging unit 513, the feature information extracting unit 514, the authentication unit 516, the user information management unit 517, the storage unit 518, and the communication unit 519 are respectively the same as the functions described with respect to the first embodiment.

The radio communication unit 511b is a functional unit that receives specific information from a radio tag in a predetermined range by short range radio communication using the short range radio communication device 339. The radio communication unit 511b emits radio waves in order to receive the specific information from the radio tag, when the radio communication unit 511b receives, from the human body detecting unit 501, detection information indicating that a person has been detected. The radio communication unit 511b is realized by, for example, the short range radio communication device 339 illustrated in FIG. 3, and a program operated by the CPU 331 illustrated in FIG. 3. The radio communication unit 511b receives the specific information, such as the radio tag ID, from the RFID tag 105 that is present in the radio detection range 202, which is formed by the emission of radio waves and illustrated in FIG. 2. Further, the radio communication unit 511b stops the emission of radio waves, if the execution determining unit 523 determines that an image authentication process is being executed when a radio authentication process is completed, as described later. If plural RFID tags 105 are present in the radio detection range 202, the radio communication unit 511b is able to receive the specific information, such as the radio tag ID, from each of the RFID tags 105.

The image authentication unit 515b is a functional unit that executes, based on an image captured by the imaging unit 513 and preregistered user information, authentication of a user included in the image captured by the imaging unit 513. The image authentication unit 515b is realized by, for example, a program operated by the CPU 331 illustrated in FIG. 3. The image authentication unit 515b executes, based on feature information of a facial image of the user, the feature information being extracted by the feature information extracting unit 514 from the image captured by the imaging unit 513, and the preregistered user information (for example, the user information-a 520 and the user information-A 506), image authentication of the user included in the image. The image authentication unit 515b authenticates the user included in the image in the authentication, if one set of feature information corresponding to the feature information of the facial image extracted by the feature information extracting unit 514 is included in the preregistered user information. Further, the image authentication unit 515b outputs information indicating the user authenticated by the authentication, to the authentication unit 516. The image authentication unit 515b may output the information indicating the user authenticated by the authentication, to the storage unit 518 and cause the storage unit 518 to store therein the information, in order to retain the information. Further, the image authentication unit 515b notifies the execution determining unit 523 of the fact that the image authentication process has been completed, when the image authentication process is completed.

The execution determining unit 523 is a functional unit that determines whether or not the image authentication process is being executed by the image authentication unit 515b, when the radio authentication process is completed by the radio authentication unit 512. Specifically, the execution determining unit 523 determines, when the radio authentication process is completed: that the image authentication process has been completed, if the execution determining unit 523 has received notification that the image authentication process had been completed, from the image authentication unit 515b; and that the image authentication process is being executed, if the notification has not been received. The execution determining unit 523 is realized by, for example, a program operated by the CPU 331 illustrated in FIG. 3. The execution determining unit 523 determines whether or not the notification that the image authentication process had been completed has been received from the image authentication unit 515b in order to determine whether or not the image authentication process is being executed, but the determination is not limited to this example. For example, the image authentication unit 515b may continue to send information indicating that the image authentication process is being executed during execution of the image authentication process, and may stop sending the information at a time point, at which the image authentication process is completed. In this case, the execution determining unit 523 may determine that the image authentication process is being executed, if the execution determining unit 523 is receiving the signal corresponding to that information from the image authentication unit 515b when the radio authentication process by the radio authentication unit 512 is completed.

The radio communication unit 511b, the radio authentication unit 512, the imaging unit 513, the feature information extracting unit 514, the image authentication unit 515b, the authentication unit 516, the user information management unit 517, the storage unit 518, the communication unit 519, and the execution determining unit 523, of the operating unit 330b illustrated in FIG. 17 represent their functions conceptually, and are not limited to such a configuration. For example, more than one of the functional units illustrated as independent functional units in the operating unit 330b illustrated in FIG. 17 may be configured as a single functional unit. On the contrary, the function that one of the functional units in the operating unit 330b illustrated in FIG. 17 has may be divided into plural functions, and may be configured as plural functional units.

Further, a part or all of the radio communication unit 511b, the radio authentication unit 512, the imaging unit 513, the feature information extracting unit 514, the image authentication unit 515b, the authentication unit 516, the user information management unit 517, and the execution determining unit 523, of the operating unit 330b may be realized by a hardware circuit, such as an FPGA or ASIC, instead of a program, which is software.

Authentication Process of Image Forming Apparatus

FIG. 18 is a flow chart illustrating an example of an authentication process of the image forming apparatus according to the third embodiment. By reference to FIG. 18, a flow of an authentication process of the image forming apparatus 101b according to this embodiment will be described. It will be assumed that at a starting time point of the authentication process illustrated in FIG. 18, the image forming apparatus 101b has been controlled in the above described power saving state by the power state control unit 502.

Steps S601 and S602

Processing of Steps S601 and S602 is respectively the same as the processing of Steps S401 and S402 of the first embodiment illustrated in FIG. 11. The process is then advanced to Step S603.

Step S603

The radio communication unit 511b of the operating unit 330b starts emitting radio waves in order to receive specific information from a radio tag (RFID tag 105) when the operating unit 330b is restored to the normal state by the power state control unit 502 and detection information indicating that a person has been detected is received from the human body detecting unit 501. The process is then advanced to Steps S604 and S607.

Step S604

The radio communication unit 511b and the radio authentication unit 512 of the operating unit 330b execute, for example, the radio authentication process illustrated in FIG. 8. When, after entering the sensor detection range 201 illustrated in FIG. 2 and being detected by the human body detecting unit 501, the user 106 having the RFID tag 105 further enters the radio detection range 202, by the radio waves emitted by the radio communication unit 511b, radio communication between the radio communication unit 511b and the RFID tag 105 is enabled.

When the RFID tag 105 is authenticated by the authentication by the radio authentication process, the radio authentication unit 512 outputs information indicating that the processing result of the radio authentication process is "OK" and identification information of the user of the RFID tag 105 authenticated by the authentication (for example, "user number" illustrated in FIG. 6), to the authentication unit 516. On the contrary, if the RFID tag 105 is not authenticated by the authentication by the radio authentication process, the radio authentication unit 512 outputs information indicating that the processing result of the radio authentication process is not "OK", to the authentication unit 516. The process is then advanced to Step S605.

Step S605

The execution determining unit 523 of the operating unit 330b determines whether or not an image authentication process is being executed by the image authentication unit 515b, when the radio authentication process by the radio authentication unit 512 is completed. The execution determining unit 523 determines that the image authentication process has been completed, if a notification that the image authentication process had been completed has been received from the image authentication unit 515b when the radio authentication process is completed (Step S605; No), and the process is advanced to Step S609. On the contrary, the execution determining unit 523 determines that the image authentication process is being executed, if the notification has not been received when the radio authentication process is completed (Step S605; Yes), and the process is advanced to Step S606.

Step S606

The radio communication unit 511b stops the emission of radio waves if the execution determining unit 523 determines that the image authentication process is being executed when the radio authentication process is completed. Thereby, a state, where radio waves are being emitted even if the radio authentication process is completed during the image authentication process, is able to be prevented, and electric power consumption is able to be reduced. The process is then advanced to Step S609.

Step S607

The imaging unit 513, the feature information extracting unit 514, and the image authentication unit 515b, of the operating unit 330b execute, for example, the image authentication process illustrated in FIG. 9. If a user included in a captured image is authenticated by the authentication by the image authentication process, the image authentication unit 515b outputs information indicating that the processing result of the image authentication process is "OK", and identification information of the user authenticated by the authentication (for example, "user number" illustrated in FIG. 6), to the authentication unit 516. On the contrary, if the user included in the captured image is not authenticated by the authentication by the image authentication process, the image authentication unit 515b outputs information indicating that the processing result of the image authentication process is not "OK", to the authentication unit 516. The process is then advanced to Step S608.

Step S608

The image authentication unit 515b notifies the execution determining unit 523 of the fact that the image authentication process has been completed, when the image authentication process is completed. The process is then advanced to Step S609.

Steps S609 to S612

Processing of Steps S609 to S612 is respectively the same as the processing of Steps S406 to S409 of the first embodiment illustrated in FIG. 11.

At Step S609, if both of the result of the radio authentication process and the result of the image authentication process are "OK" (successful) (Step S609; Yes), the process is advanced to Step S610. On the contrary, if any of the result of the radio authentication process and the result of the image authentication process is not "OK" (successful) (Step S609; No), the process is advanced to Step S613.

At Step S610, if the identification information of the user output from the radio authentication unit 512 matches the identification information of the user output from the image authentication unit 515b (Step S610; Yes), the process is advanced to Steps S611 and S612. On the contrary, if the identification information of the user output from the radio authentication unit 512 does not match the identification information of the user output from the image authentication unit 515b (Step S610; No), the process is advanced to Step S613.

Step S613

The power state control unit 502 determines whether or not a predetermined time period (for example, five minutes) has elapsed since the cancelling of the power saving states of the main body 310b and the operating unit 330b in Step S602 (that is, since the detection of the person by the human body detecting unit 501). Further, the operating unit 330b determines whether or not there has been operation input from a user (user 106) in the above mentioned predetermined time period. If the predetermined time period has elapsed without any operation input from a user (Step S613; Yes) the process is advanced to Step S614. On the contrary, if there has been operation input from a user, or if the predetermined time period has not elapsed (Step S613; No), the process is advanced to Step S616.

Step S614

The radio communication unit 511b stops the emission of radio waves. The process is then advanced to Step S615.

Step S615

The power state control unit 502 causes the main body 310b and the operating unit 330b to shift to their power saving states. For example, for the operating unit 330b, the power state control unit 502 notifies the operating unit 330b of a shift instruction, via the communication path 350, to cause the operating unit 330b to shift from the normal state to the power saving state.

Step S616

In a state where the emission of radio waves from the radio communication unit 511b has been stopped, that is, in a state where the emission of radio waves has been stopped because of the image authentication process being executed when the radio authentication process is completed in the above described Step S606 (Step S616; Yes), the process is advanced to Step S617. On the contrary, if the emission of radio waves from the radio communication unit 511b is still being continued (Step S616; No), the process is returned to Steps S604 and S607, and a radio authentication process and an image authentication process are executed again.

Step S617

The radio communication unit 511b restarts the emission of radio waves. The process is then returned to Steps S604 and S607, and again, a radio authentication process and an image authentication process are executed.

The authentication process is executed by the image forming apparatus 101b by the above operation of Steps S601 to S617.

As described above, if a radio authentication process by the radio authentication unit 512 is completed during execution of the image authentication process by the image authentication unit 515b, emission of radio waves by the radio communication unit 511b after the completion is stopped. Thereby, the wasteful emission period after the completion of radio authentication is able to be eliminated. Therefore, as compared the case of the first embodiment, the emission period of radio waves by the RFID tag reader 103 is able to be shortened and the electric power consumption resulting from the emission of radio waves is able to be reduced even more.

Supplement to Embodiments

The functional configuration of the image forming apparatus 101 (or 101a, or 101b) described with respect to each of the above described embodiments is just an example, and each of the functional units may be installed in the main body 310 (or 310a, or 310b) or may be installed in the operating unit 330 (or 330a, or 330b).

Further, in each of the above described embodiments, the main body 310 (or 310a, or 310b) and the operating unit 330 (or 330a, or 330b) operate independently of each other on separate operating systems, but not being limited thereto, for example, the main body 310 (or 310a, or 310b) and the operating unit 330 (or 330a, or 330b) may be configured to operate on the same operating system.

Further, in each of the above described embodiments, if at least any of the respective functional units of the image forming apparatus 101 (or 101a, or 101b) is realized by execution of a program, that program is provided by being incorporated in a ROM or the like beforehand. Furthermore, the program executed by the image forming apparatus 101 (or 101a, or 101b) according to each of the above described embodiments may be configured to be provided by being recorded in a computer readable recording medium, such as a compact disc read only memory (CD-ROM), a flexible disk (FD), a Compact Disk-Recordable (CD-R), or a digital versatile disc (DVD), as a file in an installable format or an executable format. Moreover, the program executed in the image forming apparatus 101 (or 101a, or 101b) of each of the above described embodiments may be configured to be stored on a computer connected to a network, such as the Internet, and to be provided by being downloaded via the network. What is more, the program executed in the image forming apparatus 101 (or 101a, or 101b) of each of the above described embodiments may be configured to be provided or distributed via a network, such as the Internet. In addition, the program executed in the image forming apparatus 101 (or 101a, or 101b) of each of the above described embodiments may have a module configuration including at least any of the above described functional units, and as to the actual hardware, the above described functional units are loaded and generated on a main storage device (for example, the RAM 313, the RAM 333, or the like) by the CPU 311 or the CPU 331 reading and executing the program from the above described storage device (for example, the ROM 312, ROM332, the storage 314, the flash memory 334, or the like).

According to an embodiment, consumption of electric power resulting from emission of radio waves from an RFID reader is able to be reduced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An information processing apparatus comprising:
at least one processor to execute computer readable instructions to configure the at least one processor to
detect a user being within a threshold distance range;
start emission of radio waves to perform radio communication with a radio tag, and obtain information from the radio tag, at least after a time point at which the user, being within the threshold distance range, is detected;
execute first authentication for the radio tag, based on the information obtained;
cause an imaging device to image a user, and acquire an image including the user;
execute second authentication for the user included in the image, based on feature information, of the image, acquired; and
authorize the user to use the information processing apparatus, upon a user of the radio tag authenticated by the first authentication being a same user as the user authenticated by the second authentication.

2. The information processing apparatus of claim 1, wherein the emission of radio waves is stopped upon the user being authorized to use the information processing apparatus.

3. The information processing apparatus of claim 1, wherein the at least one processor, upon executing the computer readable instructions, is further configured to:
calculate a first period from a start time of the radio communication to a completion time of the first authentication, and a second period from a time of detection of the user being within the threshold distance range and a completion time of the second authentication; and
start the emission of radio waves after a time period obtained by subtracting the first period from the second period; has elapsed, since the time of detection of the user being within the threshold distance range.

4. The information processing apparatus according to claim 3, wherein the at least one processor, upon executing the computer readable instructions, is further configured to:
determine whether or not a timing of completion of the first authentication is relatively, earlier than a timing of completion of the second authentication; and
start the emission of radio waves after the time period obtained by subtracting the first period from the second period has elapsed, upon the timing of completion of the first authentication being relatively earlier than the timing of completion of the second authentication.

5. The information processing apparatus of claim 1, wherein the at least one processor, upon executing the computer readable instructions, is further configured to:
determine whether or not the second authentication is being executed, in response to completion of the first authentication; and
stop the emission of radio waves upon the second authentication being executed in response to the completion of the first authentication.

6. The information processing apparatus of claim 5, wherein upon at least one of:
the first authentication not being successful;
the second authentication not being successful; and
the user of the radio tag authenticated by the first authentication not being the same as the user authenticated by the second authentication,
and upon the emission of radio waves being stopped based on a result of determination of whether or not the second authentication is being executed, the the emission of radio waves is restarted.

7. The information processing apparatus of claim 1, wherein the at least one processor, upon executing the computer readable instructions, is further configured to
stop the emission of radio waves upon a time period elapsing since detection of the user being within the threshold distance range and upon no operation being input on the information processing apparatus.

8. The information processing apparatus of claim 7, wherein the at least one processor, upon executing the computer readable instructions, is further configured to:
cause the information processing apparatus to shift to a power saving state upon the emission of radio waves being stopped because of:
elapse of the time period since the detection of the user being within the threshold distance range; and
no operation being input on the information processing apparatus.

9. The information processing apparatus of claim 7, wherein the at least one processor, upon executing the computer readable instructions, is further configured to
continue the emission of radio waves upon the time period has not being elapsed since the detection of the user within the threshold distance range or upon an operation being input on the information processing apparatus.

10. The information processing apparatus of claim 1, wherein upon the information obtained from the radio tag being included in first user information in which identification information specific to each user and the information being associated, the at least one processor, upon executing the computer readable instructions, being further configured to authenticate a user indicated by the identification information corresponding to the information in the first authentication.

11. The information processing apparatus of claim 10, wherein upon feature information of the image acquired being included in second user information in which identification information specific to each user and image feature information including feature information indicating a feature of the user being associated, at least one processor, upon executing the computer readable instructions, being further configured to authenticate a user indicated by the identification information corresponding to the feature information of the image in the second authentication.

12. The information processing apparatus of claim 11, wherein upon identification information of the user authenticated by the first authentication in the first user information and identification information of the user authenticated by the second authentication in the second user information are of a same user, the at least one processor, upon executing the computer readable instructions, being further configured to authorize the user to use the information processing apparatus.

13. An information processing system configured to execute authentication of a user for an information processing apparatus, the information processing system comprising:
    at least one processor to execute computer readable instructions to configure the at least one processor to
        detect a user being within a threshold distance range;
        start emission of radio waves to perform radio communication with a radio tag, and obtain information from the radio tag, at least after a time point at which the user, being within the threshold distance range, is detected;
        execute first authentication for the radio tag, based on the information obtained;
        to cause an imaging device to image a user, and acquire an image including the user;
        execute second authentication for the user included in the image, based on feature information of the image acquired; and
        authorize the user to use the information processing apparatus, upon a user of the radio tag authenticated by the first authentication being a same user as the user authenticated by the second authentication.

14. The information processing system of claim 13, wherein the at least one processor, upon executing the computer readable instructions, is further configured to:
    calculate a first period from a start time of the radio communication to a completion time of the first authentication, and a second period from a time of detection of the user being within the threshold distance range and a completion time of the second authentication; and
    start the emission of radio waves after a time period obtained by subtracting the first period from the second period has elapsed, since the time of detection of the user being within the threshold distance range.

15. The information processing system of claim 14, wherein the at least one processor, upon executing the computer readable instructions, is further configured to:
    determine whether or not a timing of completion of the first authentication is relatively earlier than a timing of completion of the second authentication; and
    start the emission of radio waves after the time period obtained by subtracting the first period from the second period has elapsed, upon the timing of completion of the first authentication being relatively earlier than the timing of completion of the second authentication.

16. An authentication method by an information processing apparatus, the authentication method including:
    detecting a user being within a threshold distance range;
    starting emission of radio waves to perform radio communication with a radio tag, and obtaining information from the radio tag, at least after a time point at which the user, being within the threshold distance range, is detected;
    executing first authentication for the radio tag, based on the information obtained;
    causing an imaging device to image a user, and acquiring an image including the user;
    executing second authentication for the user included in the image, based on feature information of the image acquired; and
    authorizing the user to use the information processing apparatus, upon a user of the radio tag authenticated by the first authentication being a same user as the user authenticated by the second authentication.

17. The authentication method of claim 16, further comprising:
    calculating a first period from a start time of the radio communication to a completion time of the first authentication, and a second period from a time of detection of the user being within the threshold distance range and a completion time of the second authentication; and
    starting the emission of radio waves after a time period obtained by subtracting the first period from the second period has elapsed, since the time of detection of the user being within the threshold distance range.

18. The authentication method of claim 17, further comprising:
    determining whether or not a timing of completion of the first authentication is relatively earlier than a timing of completion of the second authentication; and
    starting the emission of radio waves after the time period obtained by subtracting the first period from the second period has elapsed, upon the timing of completion of the first authentication being relatively earlier than the timing of completion of the second authentication.

19. A non-transitory computer-readable recording medium including programmed instructions to, when run on a computer, cause the computer to execute
    detecting a user being within a threshold distance range of an information processing apparatus;
    starting emission of radio waves to perform radio communication with a radio tag, and obtaining information from the radio tag, at least after a time point at which the user, being within the threshold distance range, is detected;
    executing first authentication for the radio tag, based on the information obtained;
    causing an imaging device to image a user, and acquiring an image including the user;
    executing second authentication for the user included in the image, based on feature information of the image acquired; and
    authorizing the user to use the information processing apparatus, upon a user of the radio tag authenticated by the first authentication being a same user as the user authenticated by the second authentication.

20. The non-transitory computer-readable recording medium of claim 15, wherein the programmed instructions, when run on a computer, cause the computer to further execute:
    calculating a first period from a start time of the radio communication to a completion time of the first authentication, and a second period from a time of detection of the user being within the threshold distance range and a completion time of the second authentication; and starting the emission of radio waves after a time period obtained by subtracting the first period from the second period has elapsed, since the time of detection of the user being within the threshold distance range.

\* \* \* \* \*